US009480980B2

(12) United States Patent
Zhou et al.

(10) Patent No.: US 9,480,980 B2
(45) Date of Patent: Nov. 1, 2016

(54) APPARATUS FOR PRODUCING PAPER-BASED CHEMICAL ASSAY DEVICES

(71) Applicant: Xerox Corporation, Norwalk, CT (US)

(72) Inventors: Jing Zhou, Pittsford, NY (US); Mandakini Kanungo, Penfield, NY (US); Nancy Y. Jia, Webster, NY (US); Yaorong Wang, Webster, NY (US); Sarah Vella, Milton (CA)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 14/312,209

(22) Filed: Jun. 23, 2014

(65) Prior Publication Data

US 2015/0367342 A1 Dec. 24, 2015

(51) Int. Cl.

| | |
|---|---|
| ***B29C 65/02*** | (2006.01) |
| ***B29C 65/18*** | (2006.01) |
| ***B32B 37/10*** | (2006.01) |
| ***B32B 38/14*** | (2006.01) |
| ***B32B 39/00*** | (2006.01) |
| ***B32B 43/00*** | (2006.01) |
| ***B30B 5/00*** | (2006.01) |
| ***B30B 15/34*** | (2006.01) |
| ***B01L 3/00*** | (2006.01) |
| ***B41J 3/407*** | (2006.01) |
| ***B41J 11/00*** | (2006.01) |

(52) U.S. Cl.
CPC .............. *B01L 3/5023* (2013.01); *B41J 3/407* (2013.01); *B41J 11/007* (2013.01); *B01L 2200/12* (2013.01); *B01L 2200/141* (2013.01); *B01L 2300/089* (2013.01); *B01L 2300/0887* (2013.01); *B01L 2300/126* (2013.01); *B01L 2300/161* (2013.01)

(58) Field of Classification Search
USPC .............................. 156/387, 580, 582, 583.1
See application file for complete search history.

(56) References Cited

U.S. PATENT DOCUMENTS

| | | | | |
|---|---|---|---|---|
| 3,826,573 | A * | 7/1974 | Heinzer | G03G 5/026 101/491 |
| 4,606,264 | A | 8/1986 | Agronin et al. | |
| 5,055,884 | A * | 10/1991 | Ndebi | G03G 15/2003 399/320 |
| 5,317,127 | A * | 5/1994 | Brewster, Jr. | F26B 3/283 219/388 |
| 6,723,500 | B2 | 4/2004 | Yu | |
| 7,267,938 | B2 | 9/2007 | Anderson et al. | |
| 8,377,710 | B2 | 2/2013 | Whitesides et al. | |
| 8,574,924 | B2 | 11/2013 | Sia et al. | |
| 8,603,832 | B2 | 12/2013 | Whitesides et al. | |
| 2004/0179053 | A1 | 9/2004 | Itoh | |
| 2007/0059718 | A1 | 3/2007 | Toner et al. | |

(Continued)

OTHER PUBLICATIONS

Martinez et al.; Diagnostics for the Developing World: Microfluidic Paper-Based Analytical Devices; Analytical Chemistry; Jan. 1, 2010; pp. 3-10; vol. 82, Issue No. 1; American Chemical Society.
Allen Wyatt; Printing a Document's Mirror Image; Allen Wyatt's WORDTIPS menu interface; Nov. 5, 2014; 3 Pages; http://word.tips.net/T001475_Printing_a_Documents_Mirror_Image.html.

*Primary Examiner* — Sing P Chan
(74) *Attorney, Agent, or Firm* — Maginot Moore & Beck LLP

(57) ABSTRACT

An apparatus produces chemical assay devices from a hydrophilic substrate, hydrophobic materials, and a chemical reagent. The apparatus includes a first print zone that forms hydrophobic material in a predetermined arrangement on the hydrophilic substrate, a structure formation unit configured to enable the first layer of the hydrophobic material to penetrate the hydrophilic substrate.

19 Claims, 12 Drawing Sheets

(56) References Cited

U.S. PATENT DOCUMENTS

| | | | |
|---|---|---|---|
| 2010/0145491 A1 | 6/2010 | Troian | |
| 2011/0111517 A1 | 5/2011 | Siegel et al. | |
| 2011/0123398 A1 | 5/2011 | Carrilho et al. | |
| 2012/0198684 A1 | 8/2012 | Carrilho et al. | |
| 2012/0328905 A1 | 12/2012 | Guo et al. | |
| 2013/0034869 A1 | 2/2013 | Whitesides et al. | |
| 2013/0162702 A1* | 6/2013 | Tombs | G03G 8/00 347/1 |
| 2014/0101956 A1* | 4/2014 | Priebe | B41J 11/002 34/60 |
| 2014/0261964 A1* | 9/2014 | Barss | E06B 9/266 156/65 |

* cited by examiner

APPARATUS FOR PRODUCING PAPER-BASED CHEMICAL ASSAY DEVICES

TECHNICAL FIELD

This disclosure relates generally to apparatuses for manufacturing devices that include hydrophilic substrates and hydrophobic materials that form hydrophobic structures in the hydrophilic substrates and, more particularly, to paper-based chemical assay devices.

BACKGROUND

Paper-based chemical assay devices include portable biomedical devices, chemical sensors, diagnostic devices, and other chemical testing devices made of a hydrophilic substrate, such as paper, hydrophobic materials, such as wax or phase change ink, and one or more chemical reagents that can detect chemical assays in test fluids. A common example of such devices includes biochemical testing devices that test fluids such as blood, urine and saliva. The devices are small, lightweight and low cost and have potential applications as diagnostic devices in healthcare, military and homeland security to mention a few. To control the flow of liquids through a porous substrate such as paper, the devices include barriers formed from wax, phase change ink, or another suitable hydrophobic material that penetrates the paper to form fluid channels and other structures that guide the fluid to one or more sites that contain reagents in the chemical assay device.

The current state of the art paper chemical assay devices is limited on fluidic feature resolution and manufacturing compatibility due to uncontrolled reflow of the wax channel after the wax is printed on the paper. The paper and wax are placed in a reflow oven where the wax melts and penetrates into the paper. The melted wax, however, tends to spread through the paper in a uniform manner not only through the thickness of the paper but laterally along the surface direction of the paper, which cannot prevent the diffusion of the fluid in the lateral direction, hence difficult to form fine lines, features and other structures. Additionally, while the paper based chemical assay devices are designed to be low-cost devices, the existing manufacturing processes that require separate ovens and adhesives to form multi-layer devices decrease the efficiency of manufacturing these devices and increase the potential for contamination and material compatibility issues. Consequently, improvements to apparatuses and methods for producing devices that include hydrophilic substrates and hydrophobic materials that form fluid channels in the devices would be beneficial.

SUMMARY

In one embodiment, an apparatus for producing chemical assay devices has been developed. The apparatus includes a substrate transport configured to move a first hydrophilic substrate in a process direction, a first print zone including at least one printhead configured to eject a first plurality of drops of a hydrophobic material to form a first layer of the hydrophobic material in a predetermined arrangement on a first side of the first hydrophilic substrate, a structure formation unit positioned in the process direction after the first print zone and configured to apply heat and pressure to the first hydrophilic substrate after the first plurality of drops of hydrophobic material are ejected onto the first hydrophilic substrate to enable the first layer of the hydrophobic material to penetrate the first hydrophilic substrate to form hydrophobic structures in the first hydrophilic substrate, and a second print zone positioned in the process direction after the structure formation unit, the second print zone including at least one other printhead configured to eject a reagent in a liquid carrier onto a region of the first hydrophilic substrate that is surrounded by the hydrophobic material in the first hydrophilic substrate.

In another embodiment, an apparatus for producing chemical assay devices has been developed. The apparatus includes a substrate transport configured to move a first hydrophilic substrate and a second hydrophilic substrate in a process direction, a first print zone including at least one printhead configured to eject a first plurality of drops of a hydrophobic material to form a first layer of hydrophobic material in a first predetermined arrangement on a first side of a first hydrophilic substrate and to form a second layer of hydrophobic material in a second predetermined arrangement on a first side of a second hydrophilic substrate, a structure formation unit positioned in the process direction to receive the first hydrophilic substrate and the second hydrophilic substrate from the substrate transport in a stack after the first hydrophilic substrate and the second hydrophilic substrate have received drops of hydrophobic material from the at least one printhead, the first side of the first hydrophilic substrate and the first layer of the hydrophobic material engaging a second side of the second hydrophilic substrate, the structure formation unit being configured to melt the first layer of hydrophobic material to enable the first layer of hydrophobic material to penetrate the first hydrophilic substrate to form hydrophobic structures in the first hydrophilic substrate and penetrate the second hydrophilic substrate to bond the first hydrophilic substrate and the second hydrophilic substrate together and to melt the second layer of the hydrophobic material to enable the second layer of hydrophobic material to penetrate the second hydrophilic substrate to form hydrophobic structures in the second hydrophilic substrate, and a second print zone positioned in the process direction to receive the first hydrophilic substrate and the second hydrophilic substrate from the structure formation unit, the second print zone including at least one other printhead configured to eject a reagent in a liquid carrier onto at least a region of the first hydrophilic substrate surrounded by the hydrophobic material in the first hydrophilic substrate or a region of the second hydrophilic substrate surrounded by the hydrophobic material in the second hydrophilic substrate.

BRIEF DESCRIPTION OF THE DRAWINGS

The foregoing aspects and other features of an apparatus that produces chemical assay devices are explained in the following description, taken in connection with the accompanying drawings.

DETAILED DESCRIPTION

Figure 1:
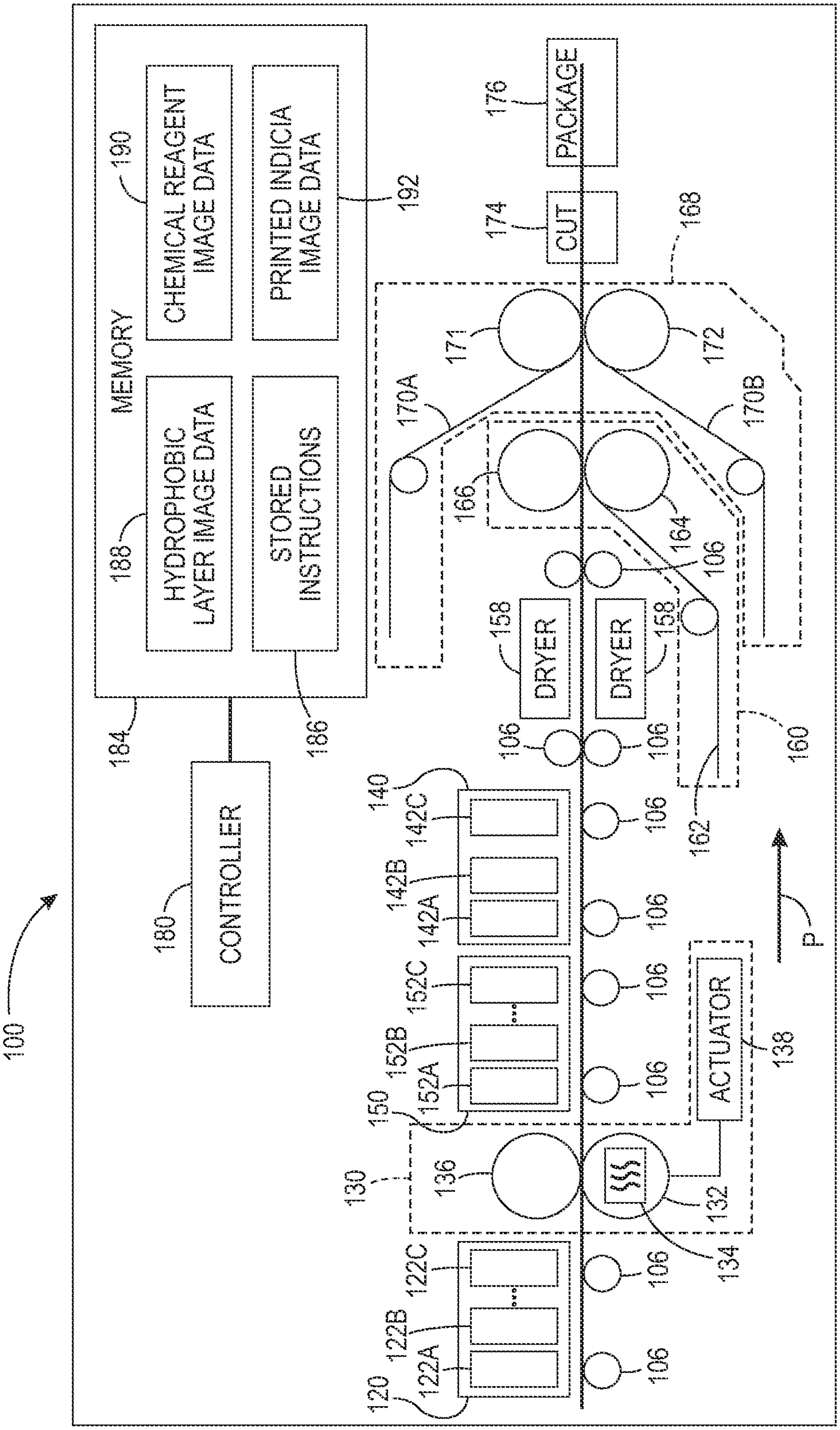
FIG. 1 is a schematic diagram of an apparatus that produces chemical assay devices using hydrophilic substrates, such as paper, and inkjet printed hydrophobic materials, such as was or phase-change inks, which form hydrophobic structures in the chemical assay devices.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with resins or colorants on media, such as digital copiers, bookmaking machines, facsimile machines, multi-function machines, or the like. In the description below, a printer is further configured to deposit a melted wax, phase-change ink, or other hydrophobic material onto a porous substrate, such as paper. The printer is optionally configured to apply a temperature gradient and pressure to the substrate that spreads the hydrophobic material and enables the hydrophobic material to penetrate into the porous substrate to form channels and barriers that control the capillary flow of liquids, including water, through the substrate.

As used herein, the term "process direction" refers to a direction of movement of a print medium, such as a paper substrate, through one or more print zones and other processing stations, units, or modules in an apparatus that produces chemical assay devices. As used herein, the term "upstream" refers to a direction of movement against the process direction and to a location along a substrate transport path that a substrate passes prior to reaching another "downstream" location. Similarly, the term "downstream" refers to a direction of movement of the print medium along the process direction and to a location along the media path that a print medium passes after passing another upstream location on the substrate path.

As used herein, the terms "hydrophilic material" and "hydrophilic substrate" refer to materials that absorb water and enable diffusion of the water through the material via capillary action. One common example of a hydrophilic substrate is paper and, in two exemplary embodiments, a cellulose filter paper or chromatography paper are used as hydrophilic substrates. The hydrophilic substrates are formed from porous materials that enable water and other biological fluids that include water, such as blood, urine, saliva, and other biological fluids, to diffuse into the substrate. As described below, a hydrophobic material is embedded in the hydrophilic substrate to form fluid channels and other hydrophobic structures that control the diffusion of the fluid through the hydrophilic substrate.

As used herein, the term "hydrophobic material" refers to any material that resists adhesion to water and is substantially impermeable to a flow of water through capillary motion. When embedded in a porous substrate, such as paper, the hydrophobic material acts as a barrier to prevent the diffusion of water through portions of the substrate that include the hydrophobic material. The hydrophobic material also acts as a barrier to many fluids that include water, such as blood, urine, saliva, and other biological fluids. As described below, the hydrophobic material is embedded in a porous substrate to form channels and other hydrophobic structures that control the capillary diffusion of the liquid through the substrate. In one embodiment, the substrate also includes biochemical reagents that are used to test various properties of a fluid sample. The hydrophobic material forms channels to direct the fluid to different locations in the substrate that have deposits of the chemical reagents. The hydrophobic material is also substantially chemically inert with respect to the fluids in the channel to reduce or eliminate chemical reactions between the hydrophobic material and the fluids. A single sample of the fluid diffuses through the channels in the substrate to react with different reagents in different locations of the substrate to provide a simple and low-cost device for performing multiple biochemical tests on a single fluid sample.

As used herein, the term "phase change ink" refers to a type of ink that is substantially solid at room temperature but softens and liquefies at elevated temperatures. Some inkjet printers eject liquefied drops of phase change ink onto indirect image receiving members, such as a rotating drum or endless belt, to form a latent ink image. The latent ink image is transferred to a substrate, such as a paper sheet. Other inkjet printers eject the ink drops directly onto a print medium, such as a paper sheet or an elongated roll of paper. Phase-change ink is one example of a phase change material that is also a hydrophobic material. Examples of phase-change inks that are suitable for use in forming fluid channels and other hydrophobic structures in hydrophilic substrates include solid inks that are sold commercially by the Xerox Corporation of Norwalk, Conn. Because the phase change ink forms a solid phase after being formed into a printed image on the substrate, the phase change ink is one example of a hydrophobic material that can be formed into channels and other hydrophobic structures on a hydrophilic substrate to control the capillary diffusion of fluids in the hydrophilic substrate.

As used herein, the term "hydrophobic structure" refers to an arrangement of hydrophobic material that extends partially or completely through a thickness of a hydrophilic substrate to control a flow of fluids through the hydrophilic substrate. Examples of hydrophobic structures include, but are not limited to, fluid barriers, fluid channel walls, wells, protective barriers, and any other suitable structure formed from a hydrophobic material that penetrates the hydrophilic substrate. As described below, an apparatus applies a temperature gradient and pressure to melt a layer of a hydrophobic phase-change material formed on a surface of a hydrophilic substrate to form different hydrophobic structures in the hydrophilic substrate in a controlled manner. In some embodiments, the hydrophobic structures are formed in multiple hydrophilic substrates and the hydrophobic material bonds the substrates together and forms fluid paths through multiple hydrophilic substrates. In a chemical assay device, the hydrophobic structures are arranged in predetermined patterns that form hydrophobic structures including fluid channels, deposit sites, and reaction sites around bare portions of a hydrophilic substrate, to bond two or more hydrophilic substrates together in multi-layer devices, and to form protective layers that prevent contamination of the chemical assay devices.

As used herein, the term "structure formation unit" refers to any device that applies a temperature gradient and optionally pressure to a hydrophilic substrate and a solid layer of hydrophobic material that is formed on a surface of the hydrophilic substrate to melt the hydrophobic material and enable the hydrophobic material to penetrate the substrate to form hydrophobic structures in the hydrophilic substrate. In the embodiments described below, the structure formation unit includes two members that engage opposite sides of a single substrate or a stack of two or more substrates. One of the members is operatively connected to a heater that heats the member to a predetermined temperature, while the other member is not heated and remains at a lower temperature. Thus, the two members form a temperature gradient from the higher temperature heated member to the lower temperature non-heated member. In the embodiments described below, an actuator is operatively connected to at least one of the members to apply pressure to the substrate and the hydrophobic material.

As used herein, the term "engage" when referencing the members in the structure formation unit refers to either direct contact between a member and one surface of a hydrophilic substrate or stack of substrates, or indirect contact through an intermediate layer. The functionality of the structure formation unit is not strictly limited to forming fluid channels with the hydrophobic material. Additional functions of the structure formation unit in some embodiments include enabling a melted layer of the hydrophobic material to penetrate two substrates to bond the two substrates together, and enabling hydrophobic material to penetrate a hydrophilic substrate to form a protective layer that prevents contamination of the hydrophilic substrate or other hydrophilic substrates that a bonded together.

As used herein, the term "plate" refers to a member with a surface that is configured to engage one side of substrate where at least the portion of the surface of the plate that engages the substrate is substantially smooth and planar. In some embodiments, the surface of the plate engages an entire side of the substrate. As described below, in some embodiments of a structure formation unit, the two members are plates. The two plates apply a temperature gradient and pressure to two sides of one substrate or either end of a stack of substrates. When one plate is heated to have a uniform surface temperature that is sufficiently high to melt one or more layers of a hydrophobic phase-change material, the hydrophobic material penetrates one or more layers of the substrate to form hydrophobic structures in the substrate. When one plate is heated to an elevated temperature while the other plate remains at a lower temperature, the melted hydrophobic material flows towards the higher-temperature plate to a greater degree than the lower temperature plate.

As used herein, the term "dwell time" refers to an amount of time that a given portion of one or more substrates spend between members in a structure formation unit. In an embodiment where the members in the structure formation unit are rollers, the amount of dwell time is related to the surface areas of the rollers that form the nip and the linear velocity of the substrate through the nip. The dwell time is selected to enable the phase-change material to penetrate the substrates and to bind the substrates together. The selected dwell time can vary based on the thickness and porosity of the substrates, the temperature gradient in the nip, the pressure in the nip, and the viscosity characteristics of the phase-change material that binds the substrates together. Larger rollers typically form a nip with a larger surface area. Thus, embodiments of bonding apparatuses with larger roller diameters operate with a higher linear velocity to achieve the same dwell time as other embodiments with smaller diameter rollers.

In a traditional inkjet printer, the phase change ink is transferred to one side of a substrate, with an option to transfer different phase change ink images to two sides of a substrate in a duplex printing operation. The printer spreads the phase change ink drops on the surface of the substrate, and the phase change ink image cools and solidifies on the surface of the print medium to form a printed image. The embodiments described below, however, apply heat and pressure to phase-change ink or another hydrophobic material on the surface of the substrate to enable the hydrophobic material to penetrate through the porous material in the substrate to form a three-dimensional barrier through the thickness of the substrate that controls the diffusion of fluids through the substrate.

FIG. 1 depicts a schematic diagram of an apparatus 100 that forms chemical assay devices with a hydrophilic substrate, fluid channels formed from a hydrophobic material that penetrates the hydrophilic substrate, and one or more chemical reagents. The apparatus 100 includes a first print zone 120 for forming a layer of hydrophobic material on a hydrophilic substrate, a structure formation unit 130, a second print zone 140 for ejecting chemical reagents in a liquid carrier onto the hydrophilic substrate, a third print zone 150 for printing indicia on the hydrophilic substrate, a membrane application station 160, a lamination station 168, a cutting unit 174, and a packaging unit 176. The apparatus 100 includes a substrate transport that moves a hydrophilic substrate, which is depicted as an elongated paper web 114 in the embodiment of FIG. 1, in a process direction P. The substrate transport includes a plurality of rollers 106 that support the web 114 and move the web 114 through the apparatus 100 along a predetermined substrate path at one or more predetermined speeds. The apparatus 100 is operated with a controller 180 that is operatively connected to a memory 184. The controller 180 controls the operations of the components in the apparatus 100 to form structures with the hydrophobic material in a hydrophilic substrate, and to apply chemical reagents to the web 114 to produce chemical assay devices, such as biomedical testing devices.

The controller 180 is a digital logic device, such as a microprocessor, microcontroller, field programmable gate array (FPGA), application specific integrated circuit (ASIC) or any other suitable digital computing device. While depicted schematically as a single unit in the apparatus 100, the functionality of the controller 180 is distributed amongst multiple digital control devices that are operatively connected to different components in the apparatus 100. For example, in some embodiments each of the printheads in the print zones 120, 140, and 150 includes a separate printhead controller that controls the operation of individual inkjets in each printhead to form printed images with the hydrophobic material, chemical reagents, and ink, respectively. The controller 180 is operatively connected to the memory 184, which includes both volatile memory devices such as static and dynamic random access memory (RAM) and non-volatile data storage devices including magnetic, optical, solid-state flash, and other suitable data storage media. The controller 180 executes stored program instructions 186 in the memory 184 to control the operation of the apparatus 100. The memory 184 also hydrophobic layer image data 188 that the controller 180 and print zone 120 use to form one or more hydrophobic layers on hydrophilic substrates, chemical reagent data 190 that the controller 180 and the print zone 140 use to deposit chemical reagents onto selected locations of the hydrophilic substrate, and printing indicia image data 192 that the controller 180 and print zone 150 use to form printed text, graphics, bar codes, or other indicia on the hydrophilic substrate.

In the apparatus 100, the first print zone 120 includes a plurality of printhead modules 122A-122C that eject liquefied drops of a hydrophobic material, such as melted wax or melted phase-change ink, onto a first side of the web 114. Each of the printhead modules 122A-122C includes one or more printheads that eject melted drops of the hydrophobic material onto the surface of the substrate 114. Each printhead includes an array of inkjets that eject the individual drops of the hydrophobic material onto different locations of the substrate 114. The arrays of inkjets and printheads form two-dimensional printed arrangements of the hydrophobic material at a predetermined resolution (e.g. 600 drops per inch) as the substrate transport moves the substrate 114 through the first print zone 120. While FIG. 1 depicts three printhead modules 122A-122C for illustrative purposes, alternative embodiments include a different number of printheads. The printheads are, for example, piezoelectric or thermal inkjet printheads that each includes a plurality of inkjets configured to eject drops of the melted hydrophobic material onto the first side of the web 114. In the embodiment of FIG. 1, multiple printheads in the print zone 120 are arranged to eject drops of the melted hydrophobic material onto the same portion of the surface of the web 114. The multiple printheads enable the print zone 120 to form a layer of the hydrophobic material on the first side of the web 114 that has sufficient thickness to form hydrophobic structures that penetrate the web 114. For example, in one configuration of the apparatus 100, the printheads in the first print zone form a layer of the hydrophobic material with a thickness of up to 0.4 mm using a range of paper substrates having a thickness of up to 1 mm. While the printheads are described as "inkjets" and the hydrophobic phase change material can be a phase-change ink in some embodiments, in some configurations the hydrophobic material is an optically transparent wax or other material that does not have a particular color. The visual representations of the hydrophobic material that are presented below are for illustrative purposes only, and different embodiments of the apparatus 100 and other apparatuses described herein use hydrophobic materials with no coloration or with any coloration that is suitable for use with a chemical assay device.

During operation, the controller 180 controls the operation of the printhead modules 122A-122C in the first print zone 120 to form the hydrophobic layer with a predetermined arrangement. The controller 180 uses predetermined image data 188 for the hydrophobic layer arrangement to control the operation of the inkjets in the printhead modules 122A-122C. Thus, the apparatus 100 is configurable to form a wide range of arrangements for the hydrophobic material on the web 114 and the arrangements can be changed using, for example, image editing software programs that are known to the art to provide updated hydrophobic layer image data 188 to the apparatus 100. As described below, the arrangement of the hydrophobic material is used to form hydrophobic structures that control the diffusion of liquids through the hydrophilic substrate. Additionally, in some devices the hydrophobic material is formed in regions that are used to bond two substrates together or to form a protective layer that prevents contamination of other portions of the chemical assay device.

In the apparatus 100, the structure formation unit 130 is located in the process direction P after the first print zone 120 and prior to the second print zone 140. In the configuration of FIG. 1, the structure formation unit includes a first member 132 and a second member 136 that are embodied as rollers. The roller 132 and 136 engage the second side and first side, respectively, of the paper web 114, and the rollers 132 and 136 rotate as the substrate transport moves the paper web 114 in the process direction P. The region between the rollers 132 and 136 is also referred to as a nip. A heater 134 is operatively connected to the first roller 132 and heats the surface of the first roller 132 to a predetermined temperature that enables the solidified hydrophobic material on the first side of the paper web 114 to melt and penetrate the paper web 114. The hydrophobic material is formed on the first side of the paper web 114 that engages the second roller 136. In the illustrative embodiment of the system 100, the heater 134 heats the surface of the first roller 132 to a temperature of between 70° C. and 140° C. The second roller 136 is not operatively connected to a heater and has a lower surface temperature. In the embodiment of FIG. 1, the second roller 136 rotates continuously while the paper web 114 moves through the apparatus 100, which enables the second roller 136 to radiate sufficient heat so that the elevated surface temperature of the first roller 132 in the nip does not substantially increase the surface temperature of the second roller 136. In the illustrative embodiment of FIG. 1, an actuator, such as a hydraulic, pneumatic, or electromechanical actuator, is connected to one or both of the rollers 132 and 136 to apply pressure to the web 114 and layer of hydrophobic material on the web 114. The actuator 138 moves the rollers 132 and 136 together to apply pressure to the paper web 114 and hydrophobic layer on the paper web 114 in a range of approximately 800 pounds per square inch (PSI) to 3,000 PSI.

Figure 6:
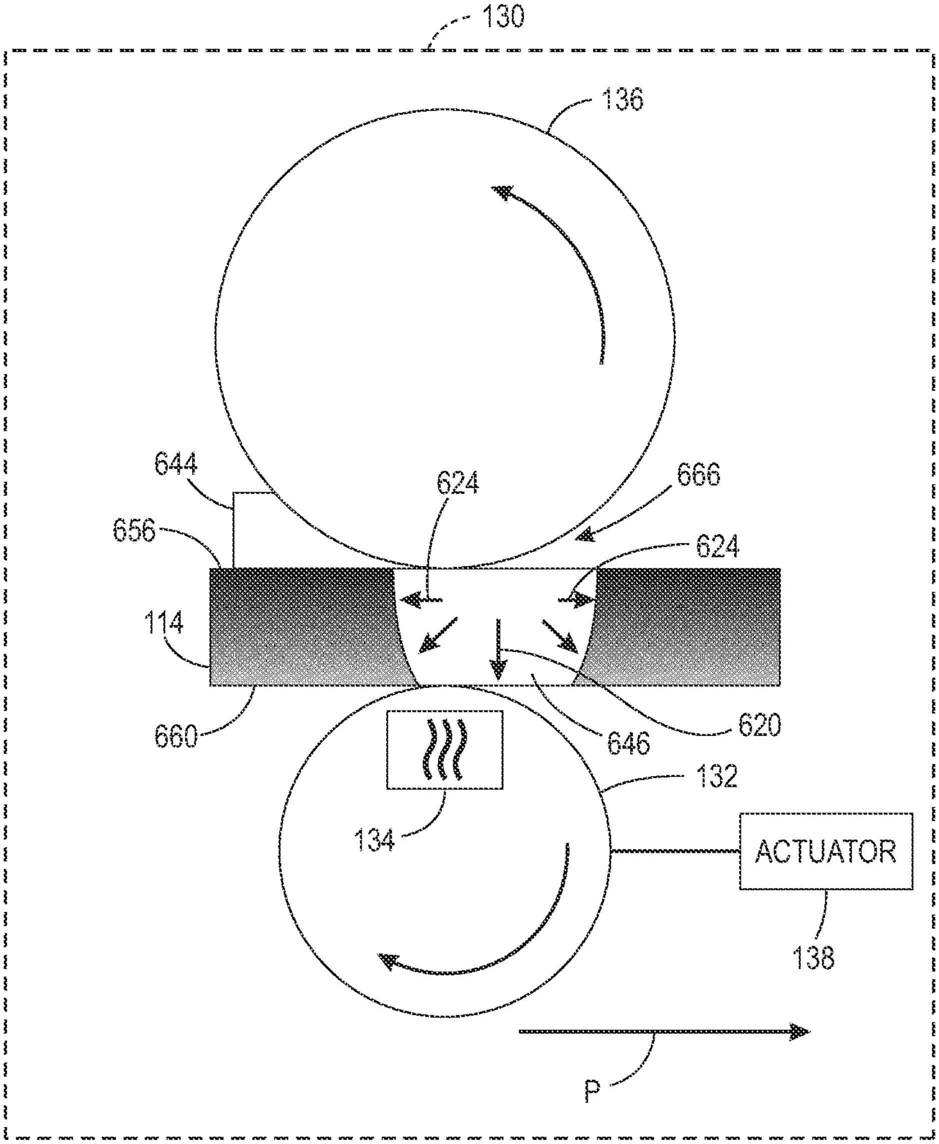
FIG. 6 is a diagram depicting operation of a structure formation unit for a single hydrophilic substrate and layer of hydrophobic material.

FIG. 6 depicts the penetration of hydrophobic material in a layer 644 formed on the first side 656 of the web 114 into the hydrophilic paper substrate that forms the web 114 in more detail. The elevated temperature and pressure in the nip 666 that is formed between the first roller 132 and second roller 136 melt the solidified hydrophobic material 644 and the liquefied hydrophobic material spreads anisotropically into the porous paper in the web 114. The spreading distance L of the liquefied hydrophobic material is provided by Washburn's equation:

$$L = \sqrt{\frac{\gamma D t}{4\eta}}$$

where γ is the surface tension of the melted hydrophobic material 644, D is the pore diameter of pores in the web 114, t is the dwell time of the substrate in the nip during which the temperature gradient and pressure in the nip reduce the viscosity of the hydrophobic material 644, and η is the viscosity of the melted hydrophobic liquid. The surface tension γ and viscosity η terms are empirically determined from the properties of the hydrophobic material 644. The pore diameter D is empirically determined from the type of paper or other hydrophilic material that forms the substrate 114. The structure formation unit 130 has direct or indirect control over viscosity η of the hydrophobic material as the hydrophobic material and substrate move through the temperature gradient that is produced in the nip 666. Hydrophobic materials such as wax or phase-change inks transition into a liquid state with varying levels of viscosity based on the temperature of the material and pressure applied to the hydrophobic material. The viscosity of the liquefied hydrophobic material is inversely related to the temperature of the material. The temperature gradient in the nip reduces the viscosity of the hydrophobic material in the higher-temperature region near the second side 660 and roller 132 to a greater degree than on the cooler side 656 and cooler roller 136. Thus, the temperature gradient enables the ink in the higher temperature regions of the temperature gradient to penetrate a longer distance compared to the ink in the cooler regions due to the reduced viscosity at increased temperature.

As is known in the art, the pressure applied in the nip 666 also reduces the effective melting temperature of the hydrophobic material 644 so that the temperature required to melt and reduce the viscosity level of the hydrophobic material 644 in the nip 666 are lower than the melting temperature at standard atmospheric pressure. Once a portion of the substrate 114 exits the nip 666, the pressure and temperature drops rapidly, which enables the hydrophobic material 644 to return to a solidified state in a more rapid and controlled manner than in the prior art reflow ovens. The dwell time of each portion of the substrate 114 in the nip 666 also affects the amount of time that the hydrophobic material 644 spends in the liquid state.

Figure 5:
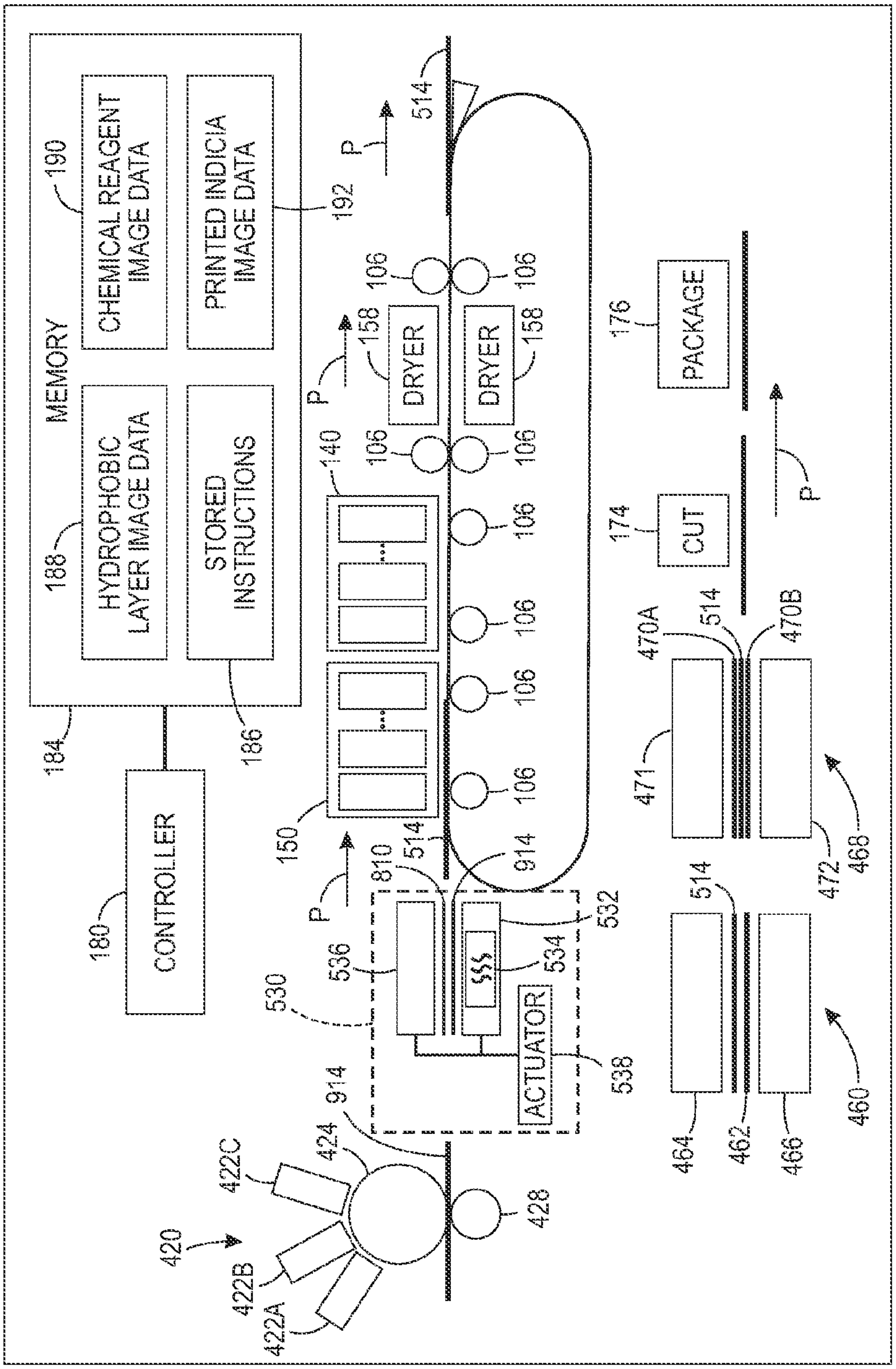
FIG. 5 is a schematic diagram of another embodiment of the apparatus of FIG. 4 that produces chemical assay devices from stacks of sheets of the hydrophilic substrate that are bonded together.

In the nip 666, the temperature gradient produces distributed heating of the melted hydrophobic material 644. The higher temperature of the first roller 132 on the second side 660 reduces the viscosity η of the hydrophobic material 144 to a greater degree than on the cooler first side 656. Thus, the temperature gradient enables the hydrophobic material 644 to flow into the porous material of the substrate 114 toward the side 660 for a longer distance than the horizontal flow of the hydrophobic material 644 along the length of the substrate 114. In FIG. 5, the longer arrow 620 depicts the longer distance of flow L for the hydrophobic material 644 through the porous material in the substrate toward the higher temperature side 660 of the substrate 114, while the shorter arrows 624 indicate a shorter flow distance along the lateral direction of the substrate 114. For a phase-change ink hydrophobic material, the reduced viscosity η of the ink as the ink penetrates the substrate 114 towards the higher temperature roller 132 enables the phase-change ink to penetrate through the substrate from the printed side 656 to the second side 660, which forms a layer of the phase-change ink through the entire thickness of the substrate 114.

The structure formation unit 130 generates the anisotropic temperature gradient and liquid flow patterns for the hydrophobic material 644 to form hydrophobic structures, for a chemical assay device with the hydrophobic material 644 that exhibits less spread along the length of the substrate 114 and improved penetration through the substrate 114 to from the printed side 656 to the blank side 660. For example, in one embodiment the horizontal width of a printed channel barrier line that is formed with the structure formation unit 130 is approximately 650 μm while prior-art reflow ovens spreads the same printed line to a width of approximately 1000 μm. In the example of FIG. 6, the hydrophobic material in the layer 644 penetrates the hydrophilic substrate 114 to form a hydrophobic fluid barrier structure 646. Furthermore, the anisotropic temperature gradient in the structure formation unit 130 enables the hydrophobic material 644 to penetrate into the substrate 114 to a greater degree than the prior art reflow ovens, which have an isotropic temperature distribution. The barriers are formed with straighter surfaces and narrower widths to enable the production of smaller devices with finer feature details. The hydrophobic structures produced with the apparatus 100 also improve the robustness and effectiveness of the fluid barriers that control the capillary diffusion of fluids through one or more substrates in a chemical assay device.

While not expressly depicted in FIG. 6, some embodiments of the apparatus 100 include an intermediate layer that is positioned between the second roller 136 and the substrate 114 and hydrophobic material layer 644 to prevent direct engagement between the second roller 136 and the hydrophobic material layer 644. In one embodiment, the intermediate layer is another paper web that acts as a sacrificial layer. The second paper web is mechanically separated from the hydrophilic substrate web 114 after passing through the structure formation unit 130.

Referring again to FIG. 1, the second print zone 140 in the apparatus 100 includes another plurality of printhead modules 142A, 142B, and 142C that eject reagents in a liquid carrier onto the substrate 114. While FIG. 1 depicts three printhead modules 142A-142C for illustrative purposes, alternative embodiments include a different number of printheads. The printhead modules 142A-142C are, for example, piezoelectric or thermal inkjet printheads that each includes a plurality of inkjets configured to eject drops of the carrier and reagents onto the web 114. The liquid carrier is any liquid that is suitable for holding a chemical reagent in solution or suspension and that is suitable for ejection through the inkjets in the printhead modules 142A-142C onto the hydrophilic material in the web 114. Common examples of liquid carriers include water, alcohol, and other solvents that evaporate after being ejected onto the paper web 114. The chemical reagents are either dissolved or suspended in the liquid carrier and remain on the web 114 after the liquid carrier has evaporated.

In the configuration of FIG. 1, different printheads are configured to eject different reagents onto different regions of the web 114. In other embodiments, a chemical assay device uses a single reagent or multiple reagents, and in some embodiments the printheads eject two or more reagents onto a single region of the web 114 to mix the reagents together on the web 114. While FIG. 1 depicts the print zone 140 in a configuration to print on the first side of the web 114, in alternative embodiments the print zone 140 includes printheads that print on the second side of the web 114 or both sides of the web 114. The second print zone 140 is positioned along the path of the web 114 after the structure formation unit 130 since some chemical reagents would be adversely affected by the heat and pressure in the structure formation unit 130. However, an alternative embodiment of the apparatus 100 that produces chemical assay devices using reagents that tolerate the heat and pressure in the structure formation unit 130 can include the second print zone positioned prior to the structure formation unit.

During operation, the controller 180 operates the printheads 142A-142C in the second print zone 140 to eject drops of the liquid carrier and chemical reagents onto portions of the web 114 that are contained within fluid channels and other regions such as reaction sites that are surrounded by the hydrophobic material. The hydrophobic material controls the diffusion of the liquid carrier and reagent to predetermined regions in the web 114, which prevents overspreading of the reagents out of a fluid channel area and enables the apparatus 100 to minimize the use of reagents to form the chemical assay devices. The controller 180 operates the printheads 142A-142C in the print zone 140 using the chemical reagent image data 190 to eject drops of the liquid carriers and reagents for one or more types of reagent onto predetermined locations on the web 114.

In the apparatus 100, the third print zone 150 includes another plurality of printhead modules 152A, 152B, and 152C that eject drops of ink onto the paper web 114 to form printed indicia. While FIG. 1 depicts three printhead modules 152A-152C for illustrative purposes, alternative embodiments include a different number of printhead modules that each includes one or more printheads. The printhead modules 152A-152C are, for example, piezoelectric or thermal inkjet printheads that each includes a plurality of inkjets configured to eject drops of an aqueous, solvent based, or phase-change ink onto the web 114. Examples of the printed indicia include text for instructions and device serial numbers, bar codes, graphical symbols, patient identifiers in embodiments where a particular chemical assay device is used to perform tests for a particular patient, and the like. In the illustrative embodiment of FIG. 1, the third print zone 150 is located in the process direction P after the structure formation unit 130 and prior to the second print zone 140. In alternative embodiments, the third print zone 150 is positioned prior to the structure formation unit 130 or first print zone 140 or after the second print zone 140. Other embodiments omit the third print zone when printing indicia on the paper web 114 is not required.

During operation, the controller 180 operates the printhead modules 152A-152C in the third print zone 150 to eject drops of ink onto portions of the web 114 to form the indicia. The different printhead modules 152A-152C optionally include different ink colors for multi-color printing. The controller 180 uses printed image indicia data 192 to control the operation of the inkjets in the printheads 152A-152C. As described above, the printed indicia image data can include graphics, text, bar codes, and any other suitable indicia for the chemical assay device.

In the apparatus 100, the substrate transport continues to move the paper web from the second print zone 140 in the process direction past a set of dryers 158, a membrane bonding station 160, lamination station 168, and to a cutting unit 174 and packaging unit 176. The dryers 158 apply forced air using one or more fans, radiant heat using a radiant heater, or a combination of forced air and radiant heat to the web 114 to aid in evaporation of the liquid carrier from the web 114 to prevent cockle, warping, or other distortion of the web 114 due to the liquid content of the liquid carrier. The membrane bonding station 160 includes two members, which are depicted as rollers 164 and 166 in FIG. 1, that bond an analyte membrane filter 162 to the substrate 114. The analyte membrane filter 162 filters out the unwanted substances in the analytes that are present in a chemical sample that is placed on the substrate 114. For example, in the instance of blood as a test fluid, the membrane separates red blood cells (and other cells) from the blood plasma and enables the blood plasma to diffuse through the fluid channels in the hydrophilic substrate 114.

While FIG. 1 depicts the membrane 162 being bonded to the second side of the web substrate 114, in alternative embodiments the membrane is bonded to the first side of the web substrate 114 or two membranes are bonded to both sides of the web substrate 114. The lamination station 168 includes roller members 171 and 172 that apply optional lamination materials, exemplified by plastic webs 170A and 170B to the substrate 114. The plastic lamination webs 170A and 170B form exterior packaging to seal the substrate 114 and prevent contamination of the substrate 114 before use. One or both of the lamination layers is removed prior to using the chemical assay device that incorporates the substrate 114. The cutting unit 174 includes one or more paper cutting blades that slice the elongated paper web 114 into smaller sheets that each includes a single chemical assay device or a multiple chemical assay devices arranged on a single sheet. The packaging station 176 includes, for example, a shrink-wrap or other suitable packaging setup that encapsulates individual sheets or stacks of sheets from the cutting unit 174 for transport to end users and storage prior to use of the chemical assay devices.

Figure 2:
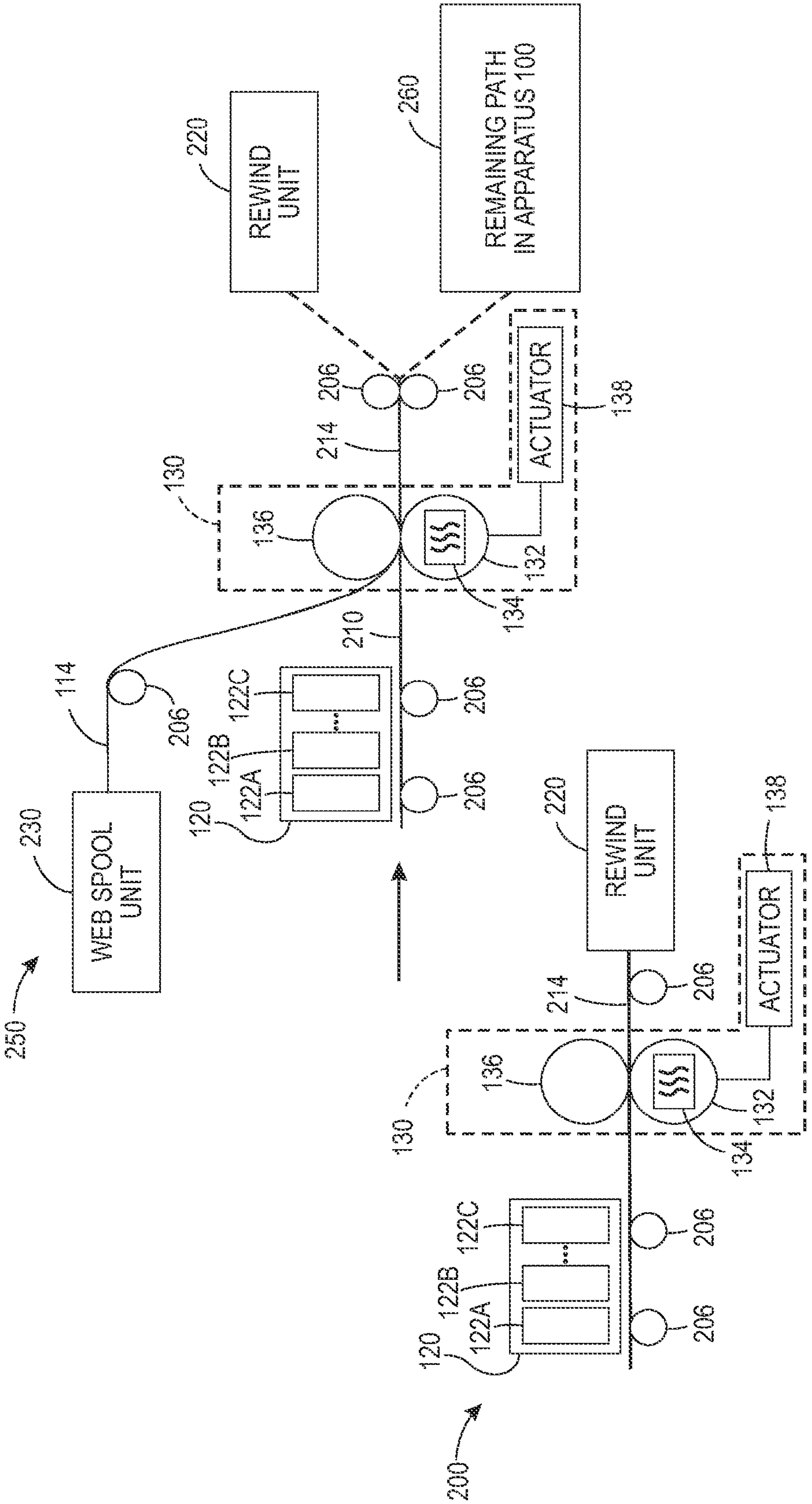
FIG. 2 is a schematic diagram of another embodiment of the apparatus of FIG. 1 that produces multiple layer devices.

FIG. 2 depicts apparatuses 200 and 250 that produce chemical assay devices using two or more hydrophilic substrates. The apparatus 200 processes one substrate 114 to form hydrophobic channels in the substrate and the apparatus 250 receives the substrate from the apparatus 200 for bonding to at least one other substrate that bears another layer of the hydrophobic material. The apparatus 250 receives the hydrophilic substrate 114 from the output of the apparatus 200 and bonds the substrate 114 to another hydrophilic substrate 210. The apparatus 250 forms a second layer of the hydrophobic material on a surface of the second hydrophilic substrate 210 and the apparatus 250 bonds the two substrates together and forms fluid channels in the second hydrophilic substrate 210 using the second layer of the hydrophobic material. In one configuration, either or both of the apparatuses 200 and 250 are modified versions of the apparatus 100. The apparatuses 200 and 250 are shown as separate devices for illustrative purposes, but the apparatus 250 is reconfigured to perform the functions of the apparatus 200 in some embodiments. While not expressly illustrated, a controller, such as the controller 180 of FIG. 1, controls the operation of individual components in the apparatuses 200 and 250.

In the configuration of FIG. 2, the apparatus 200 prints a layer of hydrophobic material onto surface of a single substrate and forms hydrophobic structures such as barriers and fluid channel walls in a hydrophilic substrate using the hydrophobic material. The apparatus 200 includes a print zone 120, which is depicted with the same configuration as the print zone 120 in the apparatus 100 for illustrative purposes. The print zone 120 includes the printhead modules 122A-122C that eject drops of the hydrophobic material to form a predetermined arrangement of the hydrophobic material on the hydrophilic substrate 114. In the apparatus 200, a substrate transport includes rollers 206 that move the web substrate 114 in a process direction from the first print zone 120 to the fluid structure formation unit 130, which has the same configuration as the fluid structure formation unit 130 of the apparatus 100. The media transport includes additional rollers 206 that move the substrate 114 to a rewind unit 220. The rewind unit 220 includes a spooler that winds the elongated media web substrate 114 into a roll for additional processing in the apparatus 250. As described above, in one embodiment the apparatus 200 is a modified version of the apparatus 100 that shares the print zone 120 and structure formation unit 130 while a modified media transport is configured to either move the web substrate 114 to the rewind unit 220 or through the remainder of the apparatus 100 as depicted in FIG. 1.

In the configuration of FIG. 2, the apparatus 250 receives the wound media web from the rewind unit 220 through a web spool unit 230. The apparatus 250 further includes a print zone 120, which is optionally the same print zone as depicted in FIG. 1 and in the apparatus 200, to form another layer of hydrophobic material on a second media web substrate 210. In the apparatus 250, the media transport moves both the first media web substrate 114 and the second media web substrate 210 through the structure formation unit 130. The substrate transport 206 returns the first media web substrate to the structure formation unit 130 along with the second substrate 210. The substrate transport includes the rollers 206, sensors, actuators, and other components that align the hydrophobic structures that have been formed in the first substrate 114 with the layers of hydrophobic material that are formed on the surface of the media web 210. The structure formation unit 130 then forms additional hydrophobic structures, such as fluid barriers and fluid channel walls, in the second substrate 210 and bonds the substrates 114 and 210 together to form a bonded substrate 214.

In the apparatus 250, the media transport optionally returns the bonded substrate 214 to the rewind unit 220, and the web spool unit 230 receives the bonded substrate 214. The apparatus 250 then forms another layer of the hydrophobic material on a third substrate with the print zone 120 and the structure formation unit 130 bonds together the substrate 214 and the third substrate to form a three-layer bonded substrate. The apparatus 250 operates in the same manner to form bonded stacks with four or more substrates where the apparatus bonds a single additional substrate layer to a stack of substrates during each pass through the structure formation unit 130. After the apparatus 250 processes all of the substrates and hydrophobic material layers for a chemical assay device, the substrate transport moves the bonded substrates through the remaining portion of the media path in the apparatus 100 (reference 260), which includes the second print zone 140, third print zone 150, analyte filter membrane bonding station 160, lamination station 168, cutting unit 174, and packaging unit 176.

Figure 7A:
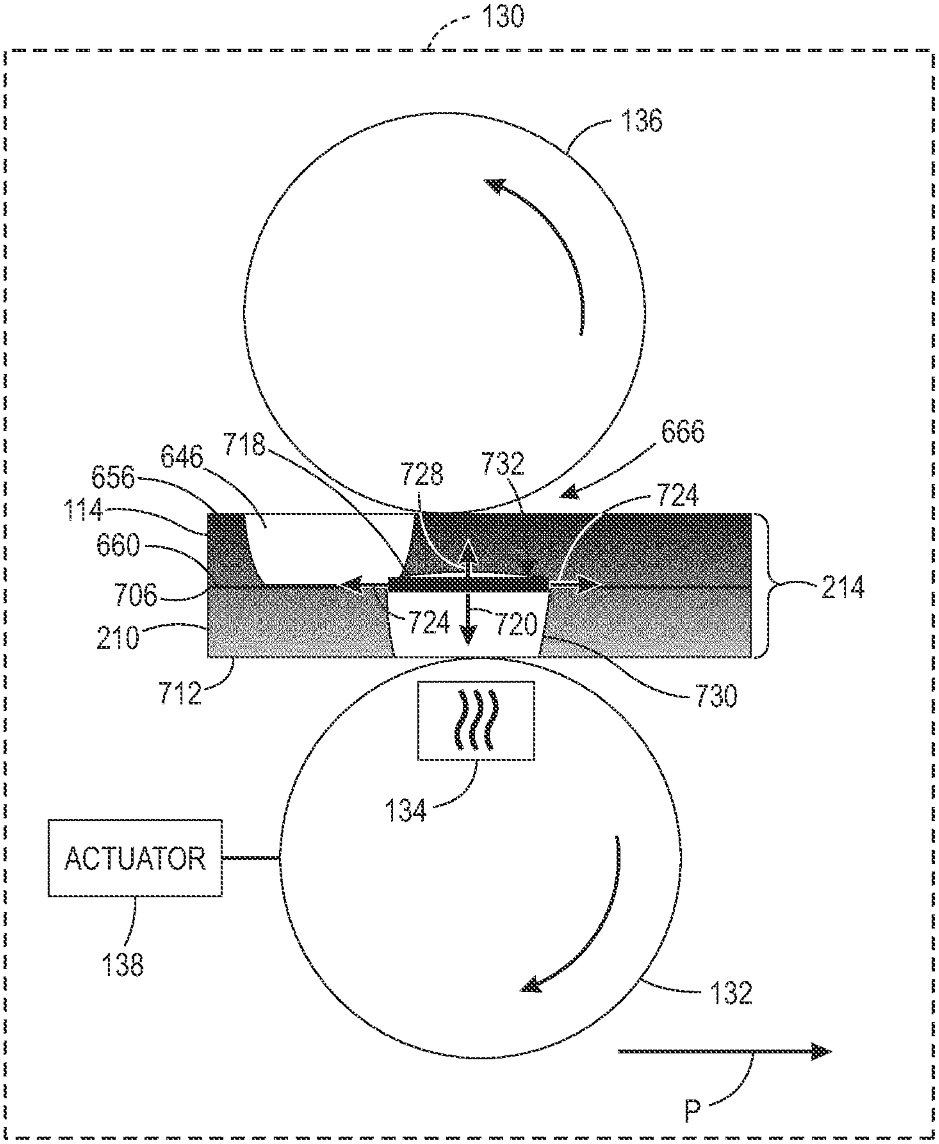
FIG. 7A is a diagram depicting operation of the structure formation unit of FIG. 6 for two hydrophilic substrates to form hydrophobic structures in one of the substrates and bond the substrates.

FIG. 7A depicts the structure formation unit 130 during the bonding process for two media webs with the apparatus 250 of FIG. 2 in more detail. In FIG. 7A, the substrate 114 includes a hydrophobic structure 646, such as a fluid barrier or fluid channel wall that was previously formed in the hydrophilic substrate as depicted in FIG. 6. The first side 656 of the substrate 114 engages the second roller 136 while the second side 660 engages a first side 706 of the second substrate 210 and a second layer of the hydrophobic material 718. A blank side 712 of the second substrate 210 engages the higher temperature first roller 132.

During operation, the actuator 138 moves the rollers 132 and 136 together to engage the stacked substrates 114 and 210. The temperature and pressure in the nip between the rollers 132 and 136 melts the layer of hydrophobic material. The temperature gradient between the rollers 132 and 136 enables the hydrophobic material in the layer 718 to melt and penetrate the substrate 210. As depicted in FIG. 7A, a larger portion of the melted hydrophobic material flows toward the higher-temperature first roller 132, as indicated by arrow 720, compared to lateral flow, as indicated by the arrows 724. The temperature gradient between the rollers 132 and 136 enables the melted hydrophobic material in the layer 718 to flow towards the higher temperature first roller 132 in a similar manner to the operation of the structure formation unit 130 described in FIG. 6.

The portion of the hydrophobic material in the layer 718 that penetrates the substrate 210 forms another hydrophobic structure 730, such as a fluid barrier or fluid channel wall. A smaller portion of the melted hydrophobic material in the layer 718 penetrates the substrate 114, as indicated by arrow 728, which bonds the two substrates 114 and 210 together. Some of the hydrophobic material remains between the substrates 114 and 210 to maintain the bond. In the embodiment of FIG. 7A, a portion of the hydrophobic material 718 merges with the hydrophobic material in the barrier 646 in the region 732, which increases the strength of the bond between the two layers 114 and 210. The hydrophobic barrier 646 in the substrate 114 remains substantially intact during the fluid structure formation in the substrate 210 and bonding process between the substrates 114 and 210. In the illustrative example of FIG. 7A, the structure formation unit 130 forms the bonded substrate 214 and the substrate transport moves the bonded substrates 214 in the process direction through the rest of the apparatus 100.

Figure 3:
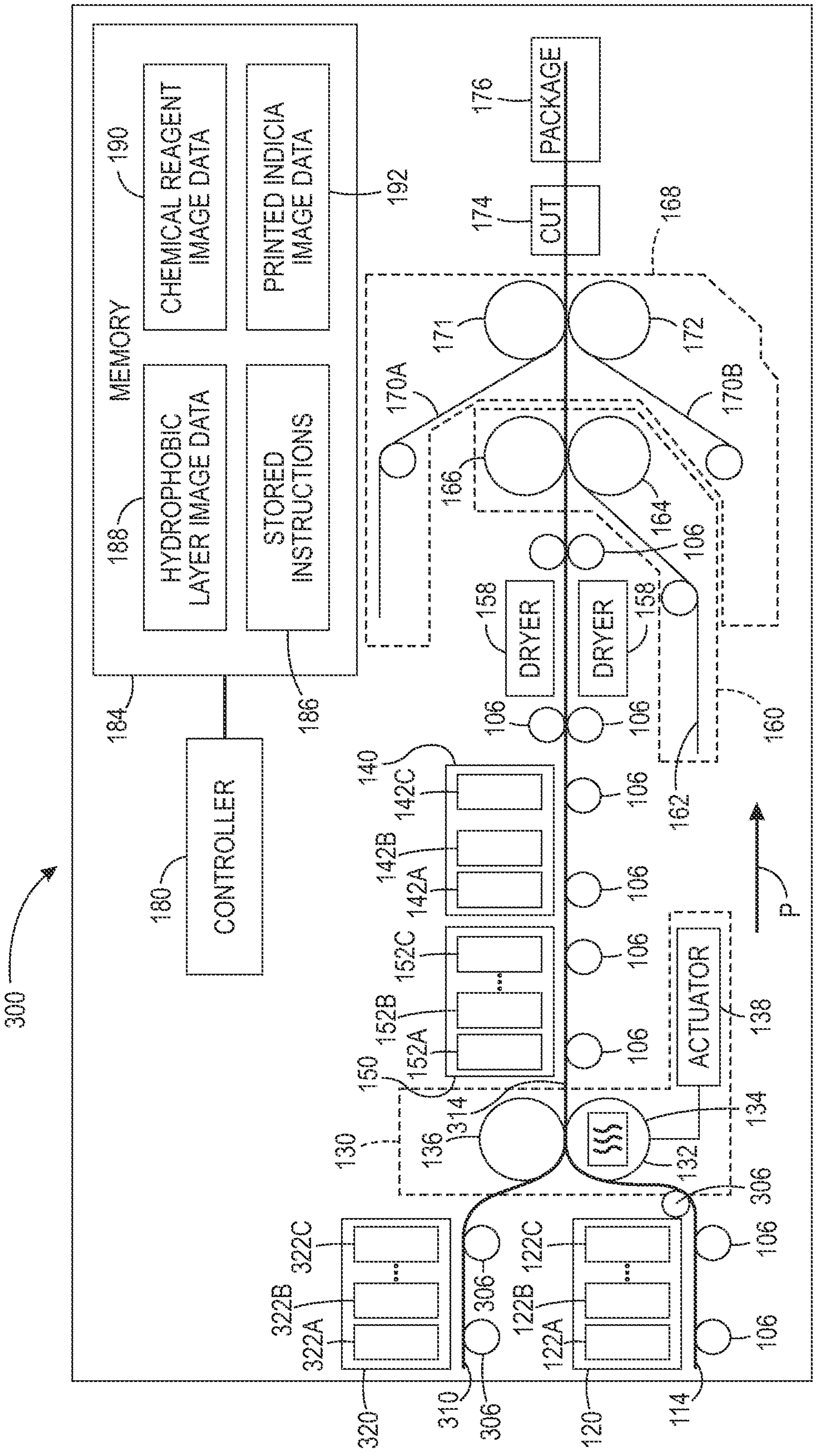
FIG. 3 is a schematic diagram of another embodiment of the apparatus of FIG. 1 that produces multiple layer devices.

FIG. 3 depicts another configuration of an apparatus 300 for producing multi-layer chemical assay devices using two or more substrates. The apparatus 300 includes many of the components that are described above with regards to the apparatus 100. The apparatus 300 further includes a fourth print zone 320 that includes printhead modules 322A, 322B, and 322C. The printhead modules 322A-322C are configured in substantially the same manner as the printhead modules 122A-122C in the first print zone 120 and the printhead modules 322A-322C eject drops of the hydrophobic material onto a first side of a second hydrophilic substrate, which is embodied as a second elongated paper web 310 in FIG. 3. The substrate transport in the apparatus 300 includes additional rollers 306 that guide both the first web 114 and the second web 310 to the structure formation unit 130. The structure formation unit 130 forms fluid channels from the layers of hydrophobic material that are formed on the substrates in both the web 114 and 310. Additionally, the structure formation unit 130 bonds the two webs 114 and 310 together to form a bonded web 314 that subsequently passes the third print zone 150, second print zone 140, dryers 158, membrane bonding station 160, lamination station 168, cutting unit 174, and packaging unit 176. While FIG. 3 depicts two print zones 120 and 320 that each form layers of the hydrophobic material on two separate substrates prior to fluid structure formation and bonding, alternative configurations include three or more substrates that each receive a layer of hydrophobic material in a separate print zone.

During operation, the controller 180 operates the printheads in the print zones 120 and 320 to form predetermined arrangements of the hydrophobic material on the first sides of each of the webs 114 and 310, respectively. In many embodiments, the first print zone 120 forms a first layer of the hydrophobic material with a different arrangement than a second layer of the hydrophobic material that is formed in the second print zone 320. The controller 180 uses different sets of image data for the different hydrophobic layers. The fluid channels and other hydrophobic structures that are formed from each of the hydrophobic layers in the hydrophilic substrates often align with each other through the thickness (z-axis) of the two substrates 114 and 310 to enable fluid to diffuse between the two substrates along predetermined three-dimensional fluid paths in a similar manner to how the fluid channels in a single substrate control the diffusion of fluid in two dimensions.

Figure 7B:
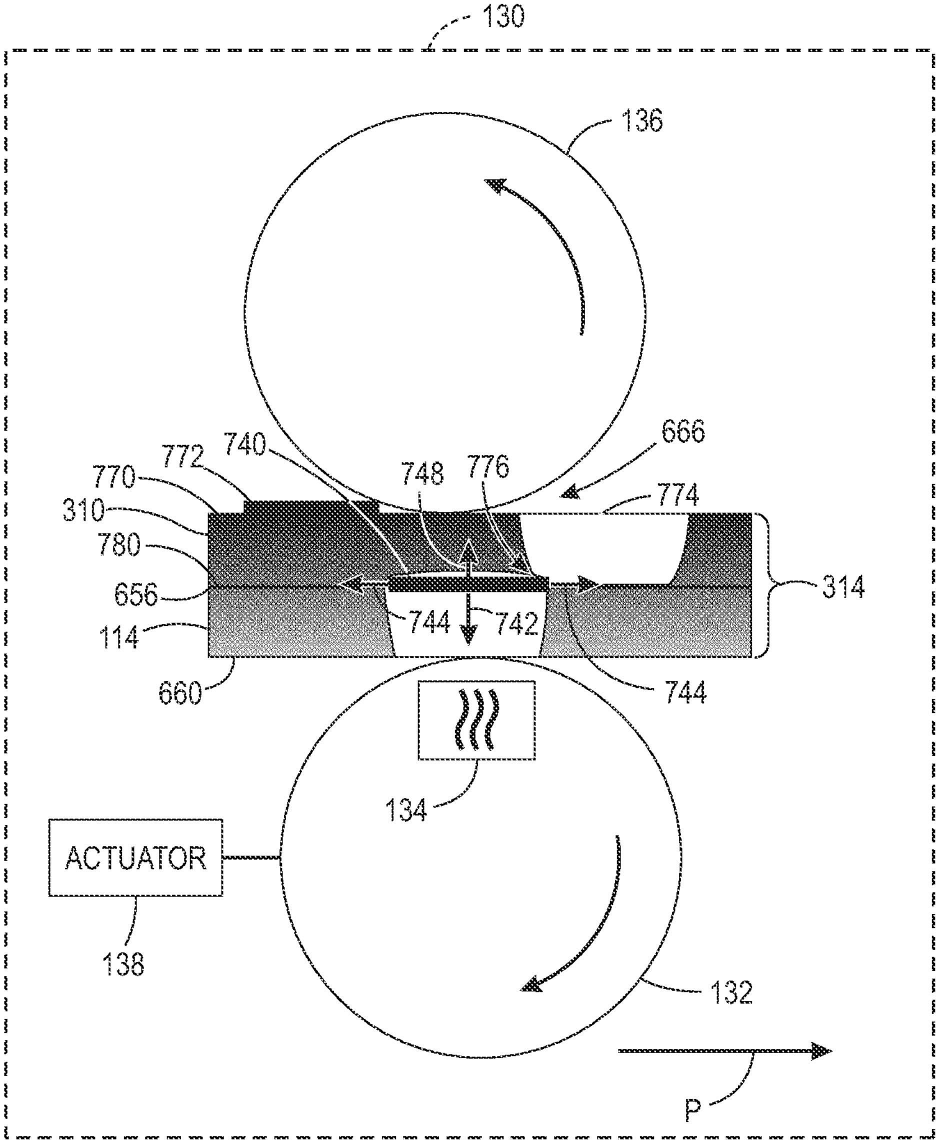
FIG. 7B is a diagram depicting operation of the structure formation unit of FIG. 6 for two hydrophilic substrates to form hydrophobic structures and bond both substrates in a single operation.

FIG. 7B depicts the structure formation unit 130 during structure formation and bonding in the two hydrophilic substrate webs 114 and 310 in more detail. The first web 114 includes a first layer of hydrophobic material 740 formed on the first side 656 of the substrate 114. The second side 780 of the second substrate 310 engages the first side 656 of the first substrate 114 and the first layer of hydrophobic material 740. In the nip 666, the temperature gradient from the higher temperature first roller 132 to the lower temperature second roller 136 enables a portion of the hydrophobic material 640 to melt and spread toward the higher temperature roller 132 to form hydrophobic structures through the first substrate 114 as indicated by the arrow 742 with the penetration in direction 742 to form the fluid barriers being greater than the lateral flow as depicted by the arrows 744. Similarly, the rollers 132 and 136 apply the temperature gradient and pressure to the layer of hydrophobic material 772 to form hydrophobic structures in the second substrate 310. FIG. 7B depicts the fluid barrier 774 that is formed in the second substrate 310 downstream from the nip 666 and another portion of the hydrophobic layer 772 that is upstream from the nip 666. The temperature gradient between the rollers 132 and 136 enables the melted hydrophobic material in the second layer 772 to flow toward the higher temperature first roller 132 to a greater degree than in the lateral direction.

In the structure formation unit 130, another portion of the melted hydrophobic material 740 penetrates the second substrate 310 as depicted by arrow 748. The portion of the hydrophobic material 740 that penetrates the first substrate 114 is greater than the portion that penetrates the second substrate 310. Some of the hydrophobic material 740 remains between the substrates 114 and 310 to maintain the bond between the two substrates. In the example of FIG. 7B, portions of the first and second hydrophobic layers that overlap each other may merge to strengthen the bond between the hydrophilic substrates as depicted in the region 776. As depicted in FIG. 7B, the hydrophobic material bonds the two webs 114 and 310 together. The hydrophobic material that bonds the substrates together is the same hydrophobic material that forms the fluid barriers and is not a specialized adhesive, which is required in prior art chemical assay devices that include multiple layers.

While FIG. 7B depicts structure formation and bonding between two substrates, in alternative configurations the structure formation unit 130 applies heat and pressure to a stack of three or more substrates to melt the hydrophobic material for forming fluid channels and bonding the stack of substrates in a single operation where actuator 138 moves the rollers 132 and 136 together to apply heat and pressure to the stack of substrates. In some embodiments, the composition of the hydrophobic material layers formed on the different substrates changes to provide different melting temperatures for the different layers of the hydrophobic material. The melting temperature decreases for layers of the hydrophobic material that are located at greater distances from the higher-temperature roller 132. For example, in an alternative embodiment the second hydrophobic layer 772 is formed from a hydrophobic material with a lower melting temperature than the hydrophobic material in the first hydrophobic layer 740.

Figure 4:
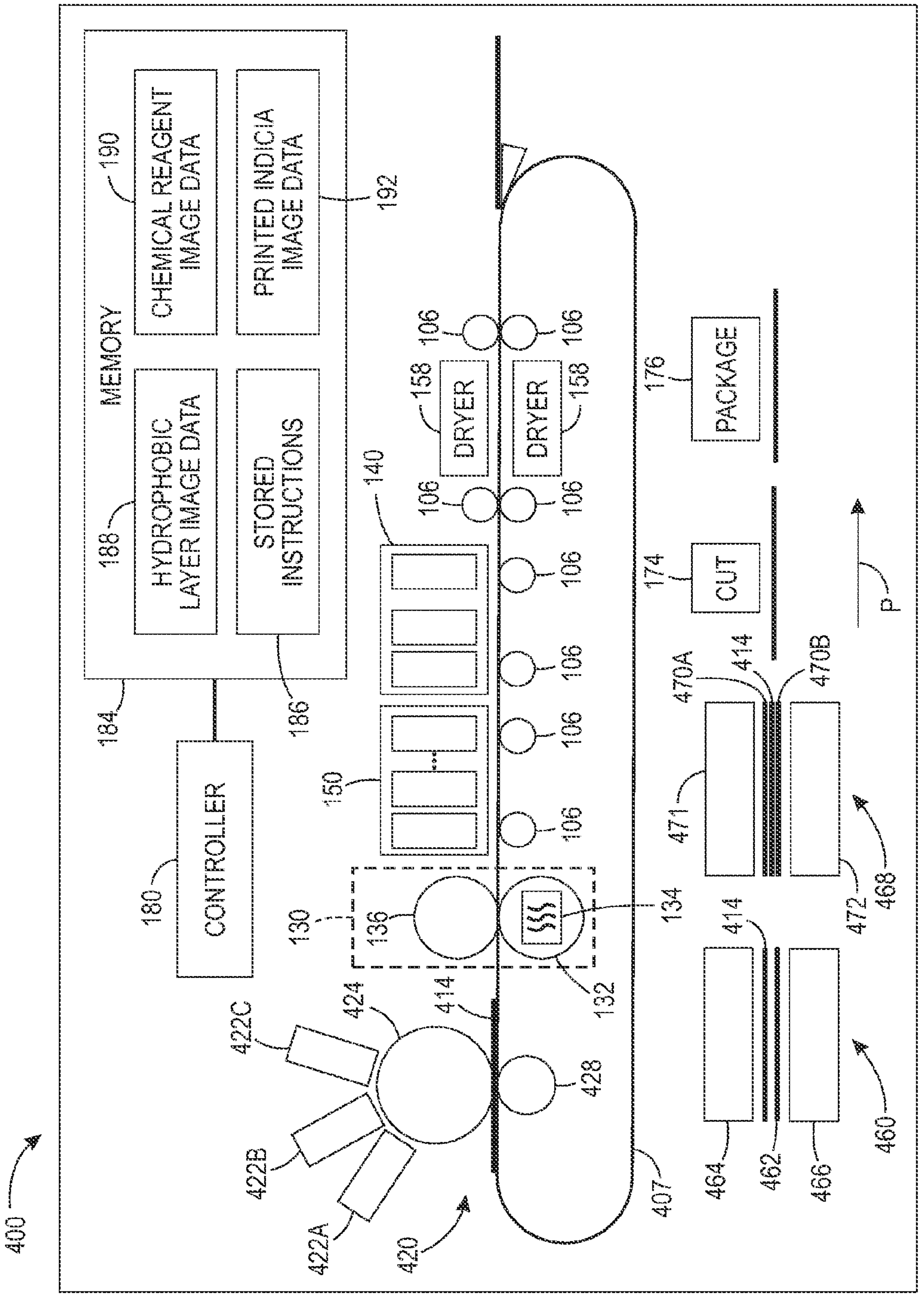
FIG. 4 is a schematic diagram of another embodiment of the apparatus of FIG. 1 that produces chemical assay devices from sheets of a hydrophilic substrate.

FIG. 4 depicts another configuration of an apparatus 400 for forming chemical assay devices. The apparatus 400 includes some components in common with the apparatuses 100, 200 and 300 of FIG. 1, FIG. 2, and FIG. 3, respectively. The apparatus 400 is configured for forming chemical assay devices on individual sheets of a hydrophilic substrate, such paper sheet 914. In the apparatus 400, the first print zone 420 is embodied as an indirect inkjet print zone including a rotating imaging drum 424, transfix roller 428, and three inkjet printhead modules 422A, 422B, and 422C. As with the embodiments above, alternative embodiments include a different number of printheads in the indirect print zone. The printhead modules 422A-422C are similar to the printhead modules 122A-122C from FIG. 1 and FIG. 3, but the printhead modules 422A-422C eject drops of the hydrophobic material onto the surface of the imaging drum 424 to form the hydrophobic layer. The imaging drum 424 continues to rotate in conjunction with the transfix roller 428 to transfer the layer of hydrophobic material from the surface of the imaging drum 424 to a first side of the paper sheet 414 as the sheet 414 passes through a nip formed between the imaging drum 424 and the transfix roller 428. The imaging drum 424 is one embodiment of an indirect image receiving member. More generally, an indirect image receiving member refers to any member with a surface that receives a latent image, such as the layer of hydrophobic material, and transfers the latent image to a substrate, such as the paper sheet 414. In one embodiment, the transfix roller 428 is removed from contact with the imaging drum 424 while the printhead modules 422A-422C form the hydrophobic layer. The imaging drum 424 optionally completes multiple rotations while the printhead modules 422A-422C eject ink drops to increase the thickness of the hydrophobic layer to a predetermined level.

In the apparatus 400, the substrate transport optionally includes an endless belt 407 that supports the substrate 914 as the substrate 914 moves through the structure formation unit 130, third print zone 150, second print zone 140, and dryers 158. The sheet 914 exits the belt 407 and is subsequently transferred to a membrane application station 468, lamination station 468, cutting unit 474, and packaging unit 476. In the embodiment of the FIG. 4, the second print zone 140 and third print zone 150 use direct inkjet printing to eject drops of the liquid carrier and reagent and indicia ink, respectively, on the sheet 414.

The apparatus 400 also includes a membrane bonding station 460 and a lamination station 468. The membrane bonding station 460 bonds an analyte filter membrane sheet 462 to the substrate 414 using two plate members 464 and 466 that apply pressure to bond the analyte filter membrane sheet 462 to the substrate 414. An actuator (not shown) moves the plate members 464 and 466 together and separates the plate member plate members 464 and 466 during operation of the apparatus 400. As with the membrane bonding station 160 in the apparatus 100, the analyte filter membrane 462 can be bonded to either side of the substrate 414, or two membranes can be bonded to both sides of the substrate 462. The optional lamination station 468 includes two plate members 471 and 472 that apply pressure to bond plastic lamination sheets 470A and 470B to the substrate 414. An actuator (not shown) moves the plate members 471 and 472 together and separates the plate member plate members 471 and 472 during operation of the apparatus 400.

FIG. 5 depicts an apparatus 500 in a configuration that produces multi-layer chemical assay devices from hydrophilic substrate sheets, such as sheets of paper. The apparatus 500 includes the first print zone 420 that is configured to print hydrophobic layers on multiple sheets of hydrophilic substrate, such as paper sheets 914 and 810. The substrate transport moves the multiple sheets of the substrate to a structure formation unit 530 that applies a temperature gradient and pressure to form hydrophobic structures in the substrates and bond the substrates together. While FIG. 5 depicts a single instance of the first print zone 420 that prints different hydrophobic layers on different substrates for a multi-layer chemical assay device, other embodiments include multiple print zones that operate concurrently to form the hydrophobic layers on different substrate sheets.

In the embodiment of FIG. 5, the structure formation unit 530 includes a first plate 532, a heater 534 that is operatively connected to the first plate 532, a second plate 536, and an actuator 538 that is operatively connected to at least one of the two plates 532 and 536. During operation, the controller 180 operates the heater 534 to heat a surface of the first plate 532 to a first temperature that enables the hydrophobic material in one or more layers between the two plates to melt within a predetermined time, such as a maximum of 10 seconds. The controller 180 operates the heater 532 to maintain the temperature of the surface of the first plate 532 at a predetermined level, such as a selected temperature between 70° C. and 140° C. The controller 180 optionally uses one or more temperature sensors (not shown) and one or more individual heating elements in the heater 534 to maintain the portion of the surface of the first plate 532 that engages the substrates 914 and 810 at a uniform temperature. The actuator 538 separates the two plates 532 and 536 when the no substrates are present between the plates to enable the second plate 536 to remain at a lower temperature during operation. In the illustrative embodiment of FIG. 5, the structure formation unit 530 forms fluid channels in two substrates 914 and 810 and bonds these substrates together to form a bonded substrate stack 514 that the substrate transport subsequently moves through the rest of the apparatus 500 in a similar manner to the apparatus 400 of FIG. 4.

In one embodiment, the apparatus 500 prints a hydrophobic layer onto a single substrate sheet and the substrate transport moves the single substrate sheet to the structure formation unit 530 to apply heat and pressure to form hydrophobic structures in a single sheet, such as the sheet 810. In another embodiment, the apparatus 500 forms fluid channels in multiple substrates and bonds the multiple substrates together in a stack to form a multi-layer chemical assay device. As described in more detail below, the structure formation unit 530 forms hydrophobic structures and bonds successive hydrophilic substrates together in one embodiment, and the structure formation unit 530 bonds multiple hydrophilic substrates together and forms hydrophobic structures in the substrates in a single operation in another embodiment.

While the configuration of FIG. 5 depicts the use of the structure formation unit 530 on two or more substrates, the structure formation unit 530 can also form hydrophobic structures in a single substrate. Additionally, in one configuration the structure formation unit 530 is configured to form hydrophobic structures and bond together more than two substrates concurrently, such as forming a chemical assay device with five substrate layers or even a larger number of layers. The substrate transport arranges the substrates and corresponding hydrophobic material layers are in the structure formation unit 530 and the temperature gradient and pressure in the structure formation unit 530 melts each of the hydrophobic layers to form hydrophobic structures and bond all of the substrates in a single operation.

In another embodiment, the structure formation unit 530 forms a multi-layer chemical assay device in a single layer at a time manner that adds a single substrate to a stack of substrates during each operation of the structure formation unit 530. For example, to form a three layer device the structure formation unit 530 first receives two substrates and applies the temperature gradient and pressure to form hydrophobic structures in the two substrates and bond the substrates together. Next, the substrate transport positions the third substrate in the structure formation unit 530 with the first side of the third substrate that bears the hydrophobic material facing away from the first plate 532 to engage a second side of the previously bonded pair of substrates and the second blank side of the third substrate engages the first plate 532. The structure formation unit 530 then applies the temperature gradient and pressure to form hydrophobic structures in the third substrate and bond the third substrate to the previously bonded pair of substrates. The process optionally continues for additional substrate layers to produce multi-layer devices.

The controller 180 operates the substrate transport to stack two or more substrates together in the structure formation unit 530. The controller 180 activates the actuator 538 to engage the plates 532 and 536 with the stacked substrates with a predetermined level of pressure, such as between 800 PSI and 3,000 PSI. In different configurations, the actuator 538 is a hydraulic, pneumatic, or electromechanical actuator that moves one or both of the plates 532 and 536 together to apply pressure to the substrates, such as the substrates 914 and 810 that are depicted in FIG. 5. The combination of the elevated temperature on the surface of the first plate 532 and the pressure between the plates 532 and 536 enables the layers of hydrophobic material to melt and penetrate the substrates to form hydrophobic structures and to bond the substrates together. In the apparatus 500, the controller 180 operates the structure formation unit 530 with a dwell time of between 0.1 seconds and 10 seconds for multiple substrate layers, although other embodiments of the structure formation unit 530 operate with shorter or longer dwell times based upon the composition of the hydrophobic material layers, thickness and porosity of the hydrophilic substrates, and the number of substrate layers that are placed between the plates.

Figure 8:
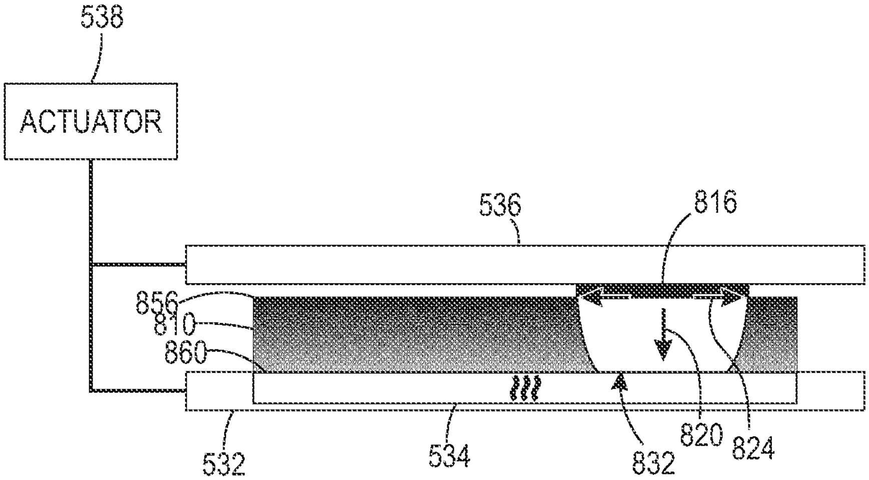
FIG. 8 is a diagram depicting operation of a structure formation unit for a single hydrophilic sheet substrate with a layer of hydrophobic material formed on one side of the sheet.

FIG. 8 depicts a single substrate sheet 810 that is positioned in the structure formation unit 530 of the apparatus 500. The substrate 810 has a first side 856 that bears a layer of the hydrophobic material 816 and the substrate 810 has a second side 860. In FIG. 8, the actuator 538 moves the first plate 532 and the second plate 536 into engages with the second side 860 and first side 856 of the sheet 810, respectively. The surface of the second plate 536 also engages the layer of the hydrophobic material 816. The plates 532 and 536 in the structure formation unit 530 apply a temperature gradient and pressure to the substrate sheet 810 to melt the layer of hydrophobic material 816 and enable the melted hydrophobic material to penetrate the substrate 810 to form a hydrophobic structure 832, such as a fluid barrier or channel wall. The melted hydrophobic material flows toward the higher temperature first plate 532 to a greater degree than the lower temperature second plate 536 or laterally through the substrate sheet 810. In FIG. 8, the arrows 824 indicate the comparatively small lateral diffusion of the hydrophobic material greater degree of penetration toward the higher temperature first plate 532 as depicted by the arrow 820. While the structure formation unit 530 includes plate members instead of the roller members that are depicted above in the structure formation unit 130, the temperature gradient and pressure that are generated in the structure formation unit 530 enable the hydrophobic material to penetrate a hydrophilic substrate in a similar manner to the structure formation unit 130.

In the illustrative embodiment of FIG. 8, the second plate 536 in the structure formation unit 530 engages the layer of hydrophobic material 816 and the second side 856 of the substrate sheet 810 directly. In an alternative embodiment, the substrate transport positions a sacrificial substrate, such as another sheet of paper or other suitable substrate, between the second plate 536 and the substrate 810 so that the second plate 536 engages the substrate 810 and the layer of hydrophobic material 816 through the sacrificial substrate. The sacrificial substrate is mechanically separated from the substrate 810 after the structure formation unit 530 applies heat and pressure to form the hydrophobic barrier 832 in the substrate 810.

Figure 9A:
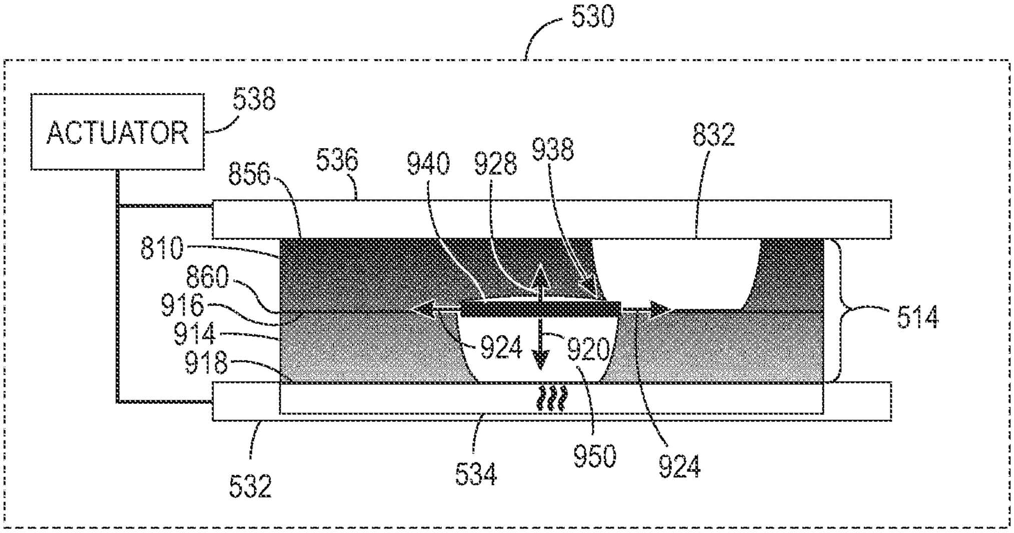
FIG. 9A is a diagram depicting operation of the structure formation unit of FIG. 8 for two hydrophilic substrate sheets to form hydrophobic structures in one of the substrate sheets and bond the substrate sheets.

FIG. 9A depicts another configuration of the structure formation unit 530 when used to bond multiple hydrophilic substrates together to form a multi-layer chemical assay device. In the configuration of FIG. 9A, the structure formation unit 530 forms fluid channels in a single hydrophilic substrate and bonds the single hydrophilic substrate to a stack of one or more additional hydrophilic substrates in a single operation. The structure formation unit 530 optionally bonds successive hydrophilic substrates to the stack to form multi-layer devices in a "single substrate at a time" manner.

In FIG. 9A, the structure formation unit 530 holds two substrates 810 and 914. For illustrative purposes, the substrate 810 is the same substrate that is depicted in FIG. 8 and the structure formation unit 530 forms the hydrophobic structure 832 in the hydrophilic substrate 810 prior to moving the hydrophilic substrate 914 bearing the hydrophobic layer 940 between the plates 532 and 536. In the apparatus 500, the substrate transport and structure formation unit 530 form the hydrophobic barrier 832 in the first substrate 810. The substrate transport leaves the substrate 810 positioned between the plates 532 and 536 and moves the second substrate 914 between the first substrate 810 and the first plate 532. The first side 856 of the substrate 810 engages the second plate 536 and the second side 860 of the substrate 810 engages a first side 916 of the substrate 914 and the layer of hydrophobic material 940. A second blank side 918 of the substrate 914 engages the surface of the first plate 532.

During operation, the actuator 538 moves the plates 532 and 536 together to engage the stacked substrates 810 and 914. As depicted in FIG. 9A, the layer of hydrophobic material 940 melts. The temperature gradient between the plates 532 and 536 enables the hydrophobic material in the layer 940 to melt and penetrate the substrate 914. As depicted in FIG. 9A, a larger portion of the melted hydrophobic material flows toward the higher-temperature first plate 532, as indicated by arrow 920, compared to lateral flow, as indicated by the arrows 924. The temperature gradient between the plates 532 and 536 enables the melted hydrophobic material in the layer 940 to flow towards the higher temperature first plate 532 in a similar manner to the structure formation unit 130 described above.

The portion of the hydrophobic material in the layer 940 that penetrates the substrate 914 forms another hydrophobic structure 950, such as a fluid barrier or fluid channel wall. A smaller portion of the melted hydrophobic material in the layer 940 penetrates the substrate 810, which bonds the two substrates 810 and 914 together. Some of the hydrophobic material remains between the substrates 810 and 914 to maintain the bond. In the embodiment of FIG. 9A, a portion of the hydrophobic material 940 merges with the hydrophobic material in the barrier 832 in the region 938, which increases the strength of the bond between the two layers 810 and 914. The hydrophobic barrier 832 in the substrate 810 remains substantially intact during the fluid structure formation in the substrate 914 and bonding process between the substrates 914 and 810. In the illustrative example of FIG. 9A, the structure formation unit 530 forms the bonded substrate 514 and the substrate transport moves the bonded substrates 514 in the process direction through the rest of the apparatus 500.

While FIG. 9A depicts the fluid structure formation in a single substrate 914 and bonding of the substrate 914 to another substrate 810, the structure formation apparatus 530 optionally accepts additional substrates to form chemical assay devices that include three or more layers. During each subsequent operation of the structure formation unit 530, the substrate transport moves the next substrate between the stack of previously bonded substrates and the first plate 532, with a layer of the hydrophobic material that is formed on one side of the next substrate engaging the stack of substrates. The structure formation unit 530 applies heat and pressure to the entire stack to form hydrophobic structures in the next substrate and to bond the next substrate to the rest of the stack. Each operation of the structure formation unit 530 adds another substrate to the stack, and the substrate transport moves the stack of multiple substrates in the process direction through the rest of the apparatus 500 after the structure formation apparatus 530 has bonded all the layers together.

Figure 9B:
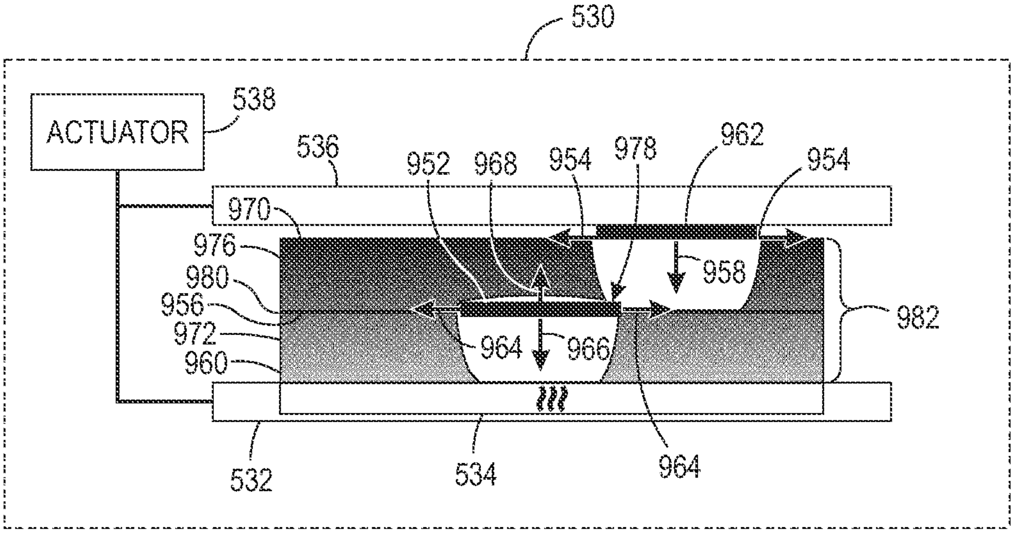
FIG. 9B is a diagram depicting operation of the structure formation unit of FIG. 8 for two hydrophilic substrates to form hydrophobic structures and bond both substrates in a single operation.

FIG. 9B depicts another configuration of the structure formation unit 530 in a configuration that generates hydrophobic structures from two layers of the hydrophobic material in two hydrophilic substrate sheets 972 and 976 during a single operation with the structure formation unit 530. In FIG. 9B, two substrates 972 and 976 are arranged in the structure formation unit 530 with two layers of hydrophobic material 952 and 962 formed on substrates 972 and 976, respectively. The substrate transport stacks both substrate sheets 972 and 976 between the plates 532 and 536 for the structure formation unit to form hydrophobic structures and bond the two substrates together in a single operation instead of the single layer at a time operation that is depicted in FIG. 9A. In the single operation, the actuator 538 moves the plates 532 and 536 together around the stacked substrate sheets 972 and 976 to apply heat and pressure to two layers of the hydrophobic material on both of the substrates to form hydrophobic structures in both substrates and bond the two substrates together simultaneously.

In FIG. 9B, the sheet 972 bears a first layer of hydrophobic material 952 that is formed on a first side 956 of the sheet 972, and a second side 960 of the first sheet 972 engages the surface of the first plate 532. The second sheet 976 bears a second layer of hydrophobic material 962 that is formed on a first side 970 of the sheet 976, and a second side 980 of the sheet 976 engages the first side 956 of the sheet 972 and the first layer of hydrophobic material 952. The first side 970 of the second sheet 976 and the second layer of 962 of the hydrophobic material engage the surface of the second plate 536, although a sacrificial substrate is positioned between the second plate 536 and the second substrate 976 in another embodiment. In the structure formation unit 530, the temperature gradient from the higher temperature first plate 532 to the lower temperature plate 536 and the pressure melt the hydrophobic material in the layers 952 and 962 to enable the hydrophobic material to penetrate the substrates 972 and 976.

The temperature gradient between the plates 532 and 536 enables the melted hydrophobic material in the layers 952 and 962 to flow towards the higher temperature first plate 532 in a similar manner to the structure formation unit 130 described above. In the illustrative embodiment of FIG. 9B, the first layer 952 melts and flows into the first substrate 972 as indicated by arrow 966 to form a hydrophobic structure such as a fluid channel barrier in the first substrate 972. Due to the temperature gradient between the plates 532 and 536, the melted hydrophobic material in the first layer 952 flows toward the first plate 532 as indicated by the arrow 966 to a greater degree than the lateral spread of the hydrophobic material as indicated by the arrows 964. A smaller portion of the hydrophobic material in the first layer 952 penetrates the second sheet 976 as indicated by the arrow 968 to bond the first sheet 972 and the second sheet 976 together into a bonded sheet 982. A portion of the hydrophobic material in the first layer 952 remains between the two substrates 972 and 976 to maintain the bond.

In the illustrative example of FIG. 9B, the second substrate 976 includes a second layer 962 of the hydrophobic material that engages the second plate 536. The hydrophobic material in the second layer 962 melts and penetrates the second sheet 976. The temperature gradient between the higher temperature first plate 532 and the lower temperature second plate 536 enables the hydrophobic material in the second layer 962 to penetrate into the sheet 976 towards the first plate 532, as indicated by the arrow 958, to a greater degree than the spreading laterally, as indicated by the arrows 954. In FIG. 9B, a portion of the hydrophobic material in the first layer 952 and the hydrophobic material in the second layer 962 merge in the region 978, which forms a stronger bond between the sheets 972 and 976.

While FIG. 9B depicts structure formation and bonding between two substrates, in alternative configurations the structure formation unit 530 applies heat and pressure to a stack of three or more substrates to melt the hydrophobic material for forming fluid channels and bonding the stack of substrates in a single operation where actuator 538 moves the plates 532 and 536 together to apply heat and pressure to the stack of substrates. In some embodiments, the composition of the hydrophobic material layers formed on the different substrates changes to provide different melting temperatures for the different layers of the hydrophobic material. The melting temperature decreases for layers of the hydrophobic material that are located at greater distances from the higher-temperature plate 932. For example, in an alternative embodiment the second hydrophobic layer 962 is formed from a hydrophobic material with a lower melting temperature than the hydrophobic material in the first hydrophobic layer 952.

Figure 10:
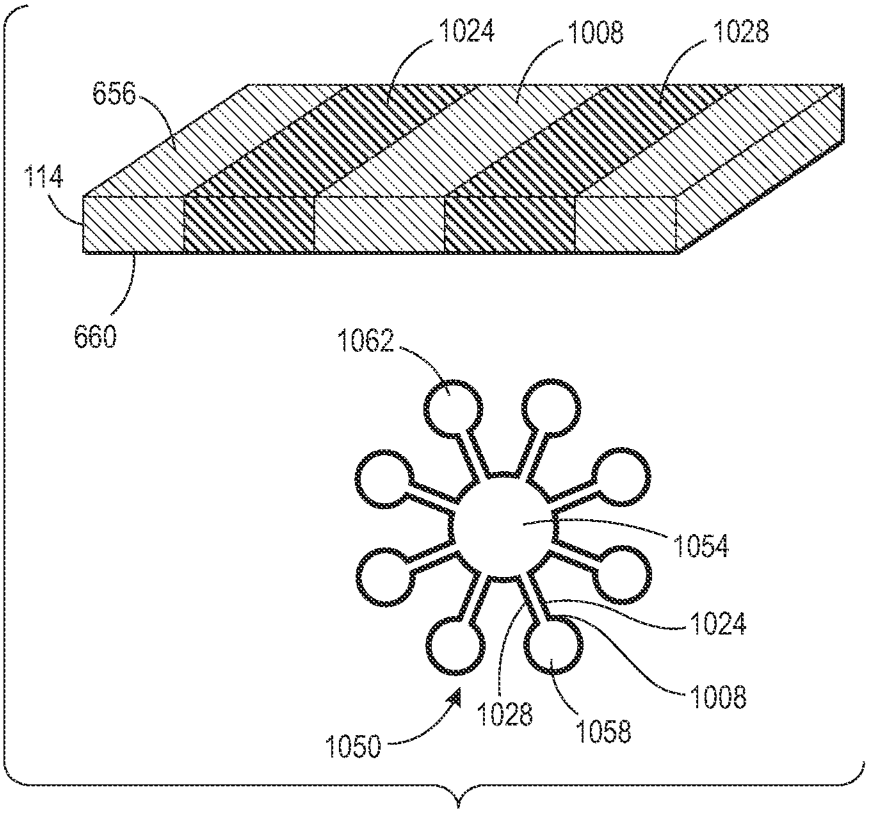
FIG. 10 is a view of a chemical assay device that includes a hydrophilic substrate layer, fluid channels formed from hydrophobic material, and a reaction sites that include chemical reagents.

FIG. 10 depicts an example of a chemical assay device 1050 that is produced with the apparatuses 100 or 400. The device 1050 is a biomedical testing device that includes a central deposit site 1054 for a sample of fluid, such as blood or saliva. As depicted in FIG. 10, the hydrophobic material penetrates the paper substrate 114 and forms fluid barriers such as fluid barriers 1024 and 1028 that surround a portion of the substrate 114 that forms a fluid channel 1008. The fluid sample diffuses through the paper substrate 114 and the hydrophobic material in the channel barriers, such as the barriers 1024 and 1028, guides the diffusion of the fluid from the deposit site 1054 to multiple reaction sites, such as the sites 1058 and 1062. Each of the reaction sites includes a chemical reagent that is formed in the biomedical testing device 1050. In the illustrative embodiment of FIG. 10, the fluid sample diffuses to the reaction sites and the chemical reagents in the reaction sites 1058 and 1062 change color in response to the chemicals contained in the fluid sample. Examples of reagents in reaction sites for different assays include, but are not limited to, tests for pH, blood sugar, anemia, and the like.

Figure 11:
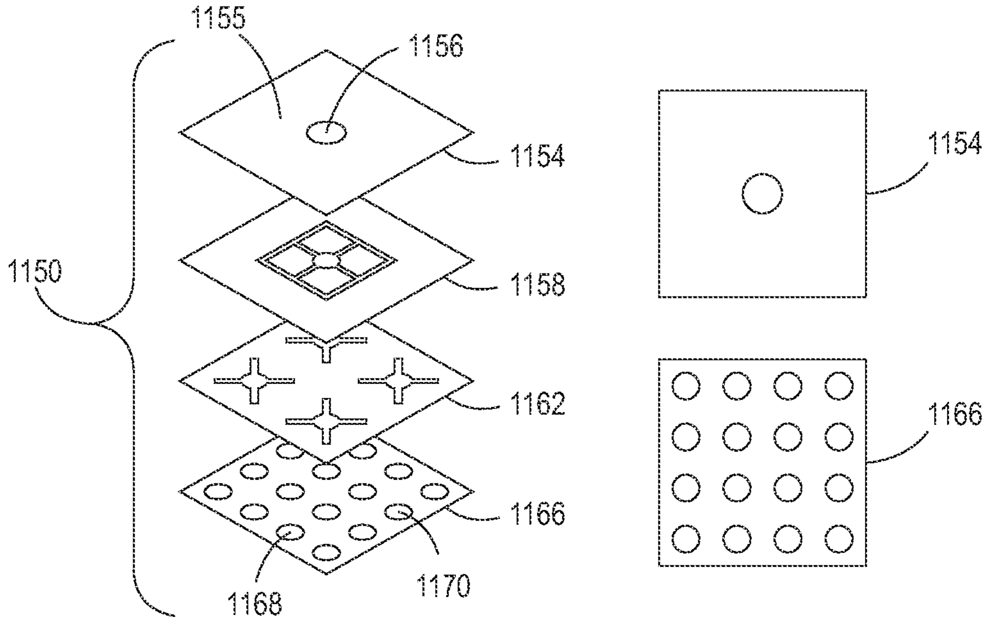
FIG. 11 is an exploded view of a chemical assay device that includes multiple hydrophilic substrate layers.

FIG. 11 depicts an example of printed hydrophobic layers that are formed on different substrate layers in a multi-layer chemical assay device. FIG. 11 depicts an illustrative embodiment of a chemical assay device that is a biomedical test device 1150. The biomedical test device 1150 includes a deposit location and fluid channels formed from the hydrophobic phase-change material to direct the fluid to different locations where chemical reagents react with the fluid. The multi-layer device 1150 is an example of a chemical assay device that is produced using the multi-layer apparatuses 200 of FIG. 2, 300 of FIG. 3, 400 of FIG. 4, or 500 of FIG. 5.

The device 1150 includes four substrate layers 1154, 1158, 1162, and 1166. The layer 1154 is an inlet layer with a region 1155 that is formed from the phase-change material and a deposit site 1156 that is formed from the bare paper substrate and receives drops of a biomedical fluid. The phase-change material in the region 1155 seals the biomedical device 1150 from one side and controls the diffusion of biomedical fluids that are placed on the deposit site 1156. The apparatuses 200, 300, 400, and 500 deposit different printed arrangements of the phase-change material onto the layers 1158, 1162, and 1166 as depicted in FIG. 11. The layers 1158 and 1162 form intermediate fluid channels that direct the fluid from the layer 1052 to different test sites in the layer 1166. The layer 1166 is the substrate that receives the printed chemical reagents from the second print zone 140 in the apparatuses 300 and 500. In the illustrative example of FIG. 11, the test site 1168 includes a chemical reagent that tests for protein levels in a blood sample and the test site 1170 includes a chemical reagent that tests for glucose levels in the blood sample. The printed arrangement on the substrate layer 1166 forms barriers to prevent diffusion of the fluid between the test sites and enables the substrate layer 1166 to be bonded to the substrate layer 1064. The multiple bonded hydrophilic substrate layers 1154, 1158, 1162, and 1166 in the chemical assay device 1150 are bonded together using the hydrophobic material in the different hydrophobic layers that are formed on each substrate using the apparatuses depicted above in FIG. 2-FIG. 5. No intermediate adhesive tape layers are required to form the chemical assay device 1150.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An apparatus for producing chemical assay devices comprising:

a substrate transport configured to move a first hydrophilic substrate in a process direction;

a first print zone including at least one printhead configured to eject a first plurality of drops of a hydrophobic material to form a first layer of the hydrophobic material in a predetermined arrangement on a first side of the first hydrophilic substrate; and a structure formation unit positioned in the process direction after the first print zone, the structure formation unit including:

a first member configured to engage a second side of the first hydrophilic substrate, the second side being different than the first side;

a second member configured to engage the first side of the first hydrophilic substrate and the first layer of the hydrophobic material;

a first heater operatively connected to the first member, the heater being configured to heat the first member to a first temperature that is greater than a second temperature of the second member; and an actuator operatively connected to at least one of the first member and the second member to move the at least one of the first member and the second member with respect to the other of the at least one of the first member and the second member to selectively engage the first and second members, and the substrate transport being further configured to move a second hydrophilic substrate between the first member and the second member as the first hydrophilic substrate moves between the first member and the second member, the second hydrophilic substrate having a first side that engages the second member and a second side that engages the first side of the first hydrophilic substrate and the first layer of the hydrophobic material as the substrate transport moves the first hydrophilic substrate between the first and second members to apply heat and pressure to the first hydrophilic substrate after the first plurality of drops of hydrophobic material are ejected onto the first hydrophilic substrate to melt the first layer of the hydrophobic material and penetrate the first hydrophilic substrate to form hydrophobic structures in the first hydrophilic substrate and enable a portion of the melted hydrophobic material in the first layer of hydrophobic material to penetrate the second hydrophilic substrate and bond the first hydrophilic substrate to the second hydrophilic substrate.

2. The apparatus of claim 1 further comprising:

a second print zone positioned in the process direction after the structure formation unit, the second print zone including at least one other printhead configured to eject a reagent in a liquid carrier onto a region of the first hydrophilic substrate that is surrounded by the hydrophobic material in the first hydrophilic substrate.

3. The apparatus of claim 2 further comprising:

a dryer positioned in the process direction after the second print zone, the dryer comprising:

at least one of a radiant heater and a fan configured to apply at least one of radiant heat and forced air, respectively, to the hydrophobic substrate to evaporate the liquid carrier.

4. The apparatus of claim 2 further comprising:

a third print zone positioned in the process direction after the structure formation unit, the third print zone including at least one other printhead configured to eject ink drops to form printed indicia on at least one of the first side and the second side of the first hydrophilic substrate.

5. The apparatus of claim 1, the first member being a first roller, the second member being a second roller, and the actuator being configured to move the at least one of the first and second rollers to selectively form a nip with the first side of the first hydrophilic substrate engaging the second roller and the second side of the first hydrophilic substrate engaging the first roller.

6. The apparatus of claim 1, the first member being a first plate, the second member being a second plate, and the actuator being configured to move the at least one of the first and second plates to engage the first side of the first hydrophilic substrate with the second plate and to engage the second side of the first hydrophilic substrate with the first plate.

7. The apparatus of claim 1, the first print zone further comprising:

a second printhead located in the process direction to enable the second printhead to eject a second plurality of drops of hydrophobic material over the hydrophobic material in a portion of the predetermined arrangement formed by the first printhead.

8. The apparatus of claim 1, the first print zone further comprising:

an indirect image receiving member configured to receive the drops of a hydrophobic material from the at least one printhead in the print zone and transfer the hydrophobic material to the first surface of the first hydrophilic substrate to form the first layer.

9. The apparatus of claim 1 further comprising:

a membrane bonding station positioned after the first print zone in the process direction, the membrane bonding station comprising:

a third member; and a fourth member positioned opposite the third member, the third member and the fourth member being positioned to receive the first hydrophilic substrate after the first hydrophilic substrate has passed between the first and second members, and the third and fourth members being configured to apply pressure to the first hydrophilic substrate and an analyte filter membrane to bond the analyte filter membrane to one of the first side and the second side of the first hydrophilic substrate.

10. The apparatus of claim 1 further comprising:

a lamination station positioned after the first print zone in the process direction, the lamination station comprising:

a third member; and a fourth member positioned opposite the third member, the third member and the fourth member being positioned to receive the first hydrophilic substrate after the first hydrophilic substrate has passed between the first and second members, and the third and fourth members being configured to apply pressure to the first hydrophilic substrate and a first lamination layer that engages the first side of the first hydrophilic substrate and a second lamination layer that engages the second side of the first hydrophilic substrate to bond the first lamination layer and the second lamination layer to the first hydrophilic substrate.

11. An apparatus for producing chemical assay devices comprising:

a substrate transport configured to move a first hydrophilic substrate and a second hydrophilic substrate in a process direction;

a first print zone including at least one printhead configured to eject a first plurality of drops of a hydrophobic material to form a first layer of hydrophobic material in a first predetermined arrangement on a first side of the first hydrophilic substrate and to form a second layer of hydrophobic material in a second predetermined arrangement on a first side of the second hydrophilic substrate;

a structure formation unit positioned in the process direction to receive the first hydrophilic substrate and the second hydrophilic substrate from the substrate transport in a stack after the first hydrophilic substrate and the second hydrophilic substrate have received drops of hydrophobic material from the at least one printhead, the first side of the first hydrophilic substrate and the first layer of the hydrophobic material engaging a second side of the second hydrophilic substrate, the structure formation unit being configured to melt the first layer of hydrophobic material to enable the first layer of hydrophobic material to penetrate the first hydrophilic substrate to form hydrophobic structures in the first hydrophilic substrate and penetrate the second hydrophilic substrate to bond the first hydrophilic substrate and the second hydrophilic substrate together and to melt the second layer of the hydrophobic material to enable the second layer of hydrophobic material to penetrate the second hydrophilic substrate to form hydrophobic structures in the second hydrophilic substrate.

12. The apparatus of claim 11 further comprising:

a second print zone positioned in the process direction to receive the first hydrophilic substrate and the second hydrophilic substrate from the structure formation unit, the second print zone including at least one other printhead configured to eject a reagent in a liquid carrier onto at least a region of the first hydrophilic substrate surrounded by the hydrophobic material in the first hydrophilic substrate or a region of the second hydrophilic substrate surrounded by the hydrophobic material in the second hydrophilic substrate.

13. The apparatus of claim 12 further comprising:

a dryer positioned in the process direction after the second print zone, the dryer comprising:

at least one of a radiant heater and a fan configured to apply at least one of radiant heat and forced air, respectively, to the hydrophobic substrate.

14. The apparatus of claim 12 further comprising:

a third print zone positioned in the process direction to receive the first hydrophilic substrate and the second hydrophilic substrate from the structure formation unit, the third print zone including at least one other printhead configured to eject ink drops to form printed indicia on at least one of the second side of the first hydrophilic substrate and the first side of the second hydrophilic substrate.

15. The apparatus of claim 11, the structure formation unit further comprising:

a first member configured to engage a second side of the first hydrophilic substrate;

a second member configured to engage the first side of the second hydrophilic substrate and the second layer of the hydrophobic material;

a first heater operatively connected to the first member, the heater being configured to heat the first member to a first temperature that is greater than a second temperature of the second member; and an actuator operatively connected to at least one of the first member and the second member to move the at least one of the first member and the second member with respect to the other of the first member and the second member to selectively engage the first and second members to enable the first member and the second member to apply heat and pressure to the first hydrophilic substrate and the second hydrophilic substrate to melt the first layer of the hydrophobic material to enable a first portion of the melted hydrophobic material from the first layer to form the hydrophobic structures in the first hydrophilic substrate, a second portion of the melted hydrophobic material from the first layer to penetrate the second hydrophilic substrate to bond the first hydrophilic substrate and the second hydrophilic substrate, and to melt the second layer of the hydrophobic material to enable the melted hydrophobic material from the second layer to form the hydrophobic structures in the second hydrophilic substrate.

16. The apparatus of claim 15, the first member being a first roller, the second member being a second roller, and the actuator being configured to move the at least one of the first and second rollers to selectively form a nip to enable the second side of the first hydrophilic substrate to engage the first roller and the first side of the second hydrophilic substrate to engage the second roller.

17. The apparatus of claim 15, the first member being a first plate, the second member being a second plate, and the actuator being configured to move the at least one of the first and second plates to engage the other of the first and second plates to enable the second side of the first hydrophilic substrate to engage the first plate and the first side of the second hydrophilic substrate to engage the second plate.

18. The apparatus of claim 11, the first print zone further comprising:

a second printhead located in the process direction to receive the first hydrophilic substrate and the second hydrophilic substrate after the first layer and the second layer are formed, the second printhead being configured to eject a second plurality of drops of the hydrophobic material over a portion of the hydrophobic material in the predetermined arrangement formed by the at least one printhead.

19. The apparatus of claim 11, the first print zone further comprising:

an indirect image receiving member configured to receive a first plurality of the drops of the hydrophobic material from the at least one printhead and transfer the first plurality of drops to the first surface of the first hydrophilic substrate to form the first layer and configured to receive a second plurality of the drops of the hydrophobic material from the at least one printhead and transfer the second plurality of drops to the first surface of the second hydrophilic substrate to form the second layer.

* * * * *